(12) United States Patent
Makino et al.

(10) Patent No.: US 11,047,495 B2
(45) Date of Patent: Jun. 29, 2021

(54) FLUID CONTROL VALVE

(71) Applicant: AISAN KOGYO KABUSHIKI KAISHA, Obu (JP)

(72) Inventors: Katsuhiko Makino, Aichi-ken (JP); Shinji Murai, Obu (JP); Yasuhiro Tsuzuki, Aichi-ken (JP); Naoya Sugiyama, Anjo (JP); Takeshi Kudo, Obu (JP)

(73) Assignee: Aisan Kogyo Kabushiki Kaisha

( * ) Notice: Subject to any disclaimer, the term of this patent is extended or adjusted under 35 U.S.C. 154(b) by 15 days.

(21) Appl. No.: 16/424,722

(22) Filed: May 29, 2019

(65) Prior Publication Data
US 2019/0376607 A1 Dec. 12, 2019

(30) Foreign Application Priority Data
Jun. 6, 2018 (JP) .............................. JP2018-108262

(51) Int. Cl.
*F16K 27/02* (2006.01)
*F02M 25/08* (2006.01)
*B60K 15/035* (2006.01)
*F16K 17/02* (2006.01)

(52) U.S. Cl.
CPC ........ *F16K 27/02* (2013.01); *B60K 15/03504* (2013.01); *B60K 15/03519* (2013.01); *B60K 2015/03514* (2013.01); *F02M 25/0836* (2013.01); *F02M 2025/0845* (2013.01); *F16K 17/02* (2013.01); *F16K 27/029* (2013.01)

(58) Field of Classification Search
CPC ........ F16K 27/00; F16K 27/02; F16K 27/029; B60K 15/03519; F02M 25/0836; F02M 2025/0845

USPC ..................................................... 251/129.15
See application file for complete search history.

(56) References Cited

U.S. PATENT DOCUMENTS 3,726,315 A * 4/1973 Sheppard ............ F16K 31/0606
137/625.65
3,921,670 A * 11/1975 Clippard, Jr. ....... F16K 31/0606
137/625.65

(Continued)

FOREIGN PATENT DOCUMENTS

| CN | 104080507 A | 10/2014 | |
|---|---|---|---|
| JP | 2005155328 A | 6/2005 | |
| WO | WO-2018073246 A1 * | 4/2018 | ............. F02M 59/48 |

OTHER PUBLICATIONS

Chinese Office Action dated Jan. 13, 2021, and English translation, for Chinese Application No. 201910484797.X.

*Primary Examiner* — Seth W. Mackay-Smith
(74) *Attorney, Agent, or Firm* — Conley Rose, P.C.

(57) ABSTRACT

A fluid control valve includes a valve unit, a valve casing, and a secondary molded member. The valve casing houses the valve unit therein and includes a first connection pipe part and a second connection pipe part. The first connection pipe part has a hollow pipe shape with a first engagement part. The second connection pipe part has a hollow pipe shape with a second engagement part. The first connection pipe part is connected to the second connection pipe part. The secondary molded member is made of a resin material and covers the first engagement part and the second engagement part to prevent the first connection pipe part from being detached from the second connection pipe part.

10 Claims, 15 Drawing Sheets

(56) References Cited

U.S. PATENT DOCUMENTS

| | | | | |
|---|---|---|---|---|
| 4,203,401 A | * | 5/1980 | Kingsley | F02M 25/0836 |
| | | | | 123/520 |
| 5,289,841 A | * | 3/1994 | Maranzano | F16K 31/0606 |
| | | | | 137/1 |
| 5,566,921 A | * | 10/1996 | Yokota | F02M 59/466 |
| | | | | 239/585.3 |
| 6,299,079 B1 | * | 10/2001 | Noller | F02M 51/005 |
| | | | | 123/472 |
| 6,941,966 B2 | * | 9/2005 | Mori | B60K 15/03519 |
| | | | | 137/202 |
| 7,168,441 B2 | * | 1/2007 | Miyoshi | B60K 15/03519 |
| | | | | 137/202 |
| 7,549,207 B2 | * | 6/2009 | Tsuge | B29C 45/006 |
| | | | | 123/516 |
| 9,683,665 B2 | * | 6/2017 | Harada | F16K 27/029 |
| 9,901,727 B2 | | 2/2018 | Ueda et al. | |
| 2020/0056572 A1 | * | 2/2020 | Landenberger | F16K 27/029 |

* cited by examiner

FLUID CONTROL VALVE

CROSS-REFERENCE TO RELATED APPLICATIONS

This application claims priority to Japanese patent application serial number 2018-108262, filed Jun. 6, 2018, which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to fluid control valves.

Japanese Laid-Open Patent Publication No. 2005-155328 discloses a fluid control valve, also referred to as flow control valve. The fluid control valve has a valve casing and a valve unit housed in the valve casing and configured to open and close a fluid passage.

The valve casing includes a first half and a second half. The first half has a first connection pipe part formed in a hollow pipe shape. The second half has a second connection pipe part formed in a hollow pipe shape that is configured to be connected with the first connection pipe part.

BRIEF SUMMARY

In one aspect of this disclosure, a fluid control valve includes a valve unit, a valve casing, and a secondary molded member. The valve casing houses the valve unit therein. The valve casing includes a first connection pipe part and a second connection pipe part. The first connection pipe part has a hollow pipe shape with a first engagement part. The second connection pipe part has a hollow pipe shape with a second engagement part. The first connection pipe part is connected to the second connection pipe part. The secondary molded member is made of a resin material and covers the first engagement part and the second engagement part to prevent the first connection pipe part from being detached from the second connection pipe part.

According to this aspect, the secondary molded member covers the first engagement part and the second engagement part to prevent the first connection pipe part from being detached from the second connection pipe part. Thus, the first and second connection pipe parts are coupled with each other without a screw, thereby avoiding an increase in the weight and/or the size of the fluid control valve that may otherwise occur by using a screw.

Other objects, features and advantage of the present teaching will be readily understood after reading the following detailed description together with the accompanying drawings and the claims.

BRIEF DESCRIPTION OF THE DRAWINGS

For a detailed description of the preferred embodiments of the present teaching, reference will now be made to the accompanying drawings.

DETAILED DESCRIPTION

Figure 1:
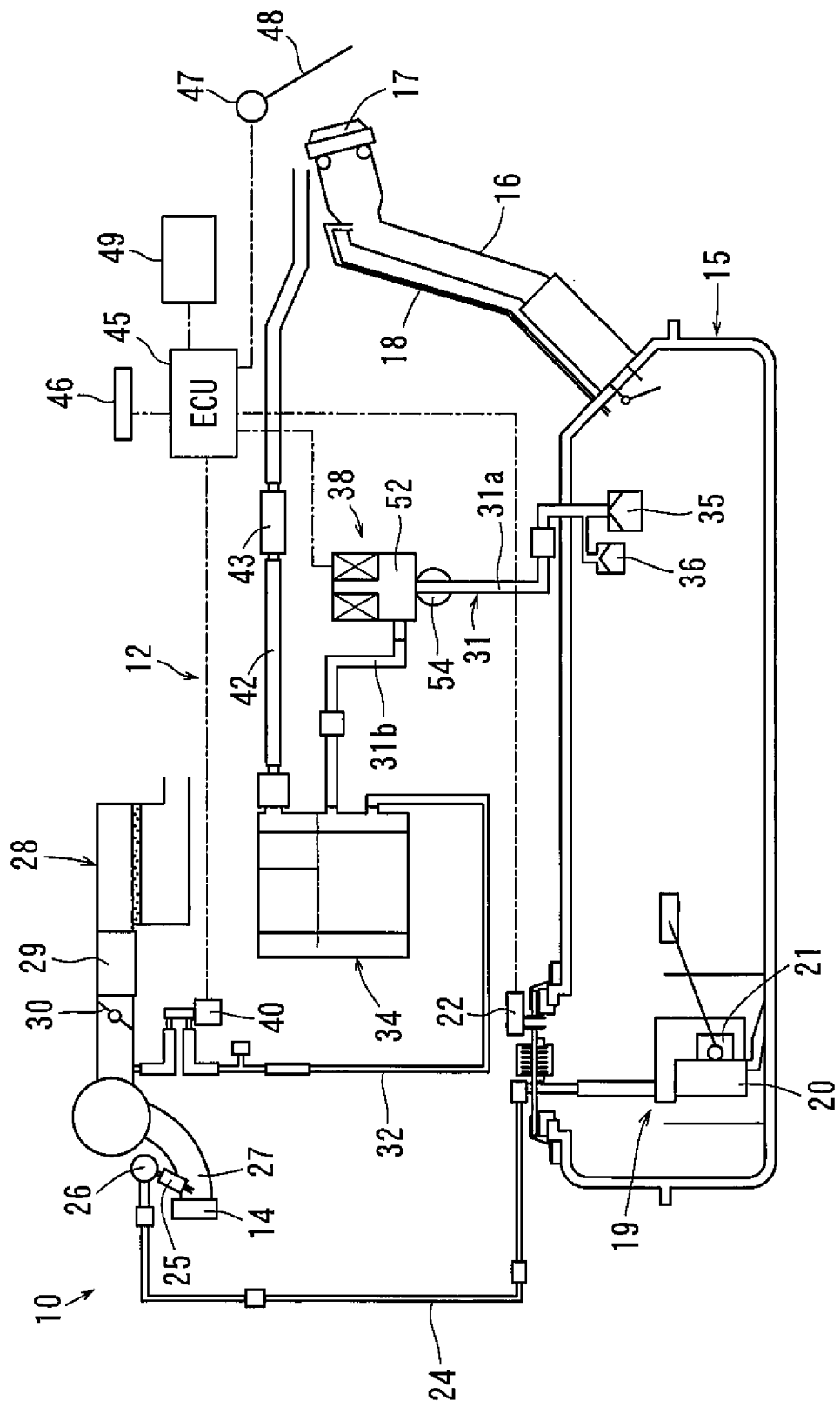
FIG. 1 is schematic view of an evaporative emission control system according to a first embodiment.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different people may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections.

Each of the additional features and teachings disclosed above and below may be utilized separately or in conjunction with other features and teachings to provide improved fluid control valves. Representative examples of the present teachings, which examples utilized many of these additional features and teachings both separately and in conjunction with one another, will now be described in detail with reference to the attached drawings. This detailed description is merely intended to teach a person skilled in the art further details for practicing preferred aspects of the present teachings and is not intended to limit the scope of the claimed subject-matter. Only the claims define the scope of the claimed subject-matter. Therefore, combinations of features and steps disclosed in the following detailed description may not be necessary to practice the claimed subject-matter in the broadest sense, and are instead taught merely to particularly describe representative examples of the present teachings. Moreover, various features of the representative examples and the dependent claims may be combined in ways that are not specifically enumerated in order to provide additional useful embodiments of the present teachings.

As previously described, the valve casing of a conventional fluid control valve includes a first half with and a second half. The first half has a first connection pipe part and the second half has a second connection pipe part connected to the first connection pipe part. The first connection pipe part is firmly connected with the second connection pipe part by a screw, which undesirably increases the weight and/or the size of the fluid control valve.

A first embodiment of the present teaching is a closing valve 38 installed in an evaporative emission control system 12 that is mounted on a vehicle having an internal combustion engine, such as an automobile. For convenience of explanation, the evaporative emission control system 12 will be described before the closing valve 38.

As shown in FIG. 1, the evaporative emission control system 12 is incorporated in an engine system 10 for a vehicle such as an automobile. The engine system 10 includes an engine 14 and a fuel tank 15 storing liquid fuel to be supplied to the engine 14. The fuel tank 15 is provided with an inlet pipe 16. The inlet pipe 16 has a filling port at an upper end part thereof and is configured to introduce liquid fuel from the filling port into the fuel tank 15. A tank cap 17 is removably attached to the filling port of the inlet pipe 16. The fuel tank 15 has a breather pipe 18 that provides fluid communication between an internal space of an upper end part of the inlet pipe 16 and a gas space in the fuel tank 15, in which fuel vapor exists.

The fuel tank 15 houses a fuel supply device 19 therein. The fuel supply device 19 includes a fuel pump 20, a fuel sender gauge 21, and a tank internal pressure sensor 22. The fuel pump 20 suctions the fuel stored in the fuel tank 15, and then pressurizes and discharges it. The fuel sender gauge 21 detects a liquid level of the fuel in the fuel tank 15. In this embodiment, the tank internal pressure sensor 22 detects a tank internal pressure as a relative pressure to the atmospheric pressure. The fuel discharged from the fuel pump 20 is delivered to the engine 14 via a fuel supply passage 24. More specifically, the fuel pump 20 pumps the fuel from the fuel tank 15 into the fuel supply passage 24. The fuel flows through the fuel supply passage 24 toward a delivery pipe 26. Then, the fuel is injected from injectors 25 of the delivery pipe 26 into an air intake passage 27 branched to combustion chambers. The air intake passage 27 is provided with an air cleaner 28, an air flow meter 29, and a throttle valve 30.

The evaporative emission control system 12 includes a vapor passage 31, a purge passage 32, and a canister 34. The vapor passage 31 has an upstream end in fluid communication with the gas space in the fuel tank 15 and a downstream end in fluid communication with the inside of the canister 34. The purge passage 32 has an upstream end in fluid communication with the inside of the canister 34 and a downstream end in fluid communication with the air intake pipe 27 downstream of the throttle valve 30. The canister 34 is filled with an activated carbon that functions as an adsorbent that adsorbs and desorbs the fuel vapor. When the fuel vapor is introduced from the fuel tank 15 into the canister 34 via the vapor passage 31, the fuel vapor is adsorbed on the activated carbon in the canister 34.

In the gas space inside the fuel tank 15, the upstream end of the vapor passage 31 is provided with an on board refueling vapor recovery (ORVR) valve 35 and a fuel cut off valve 36.

The evaporative emission control system 12 also includes the closing valve 38 at the middle of the vapor passage 31. That is, the vapor passage 31 is divided into a tank-side passage 31a and a canister-side passage 31b. The closing valve 38 is disposed between the tank-side passage 31a and the canister-side passage 31b.

The closing valve 38 has two fluid control valves. In this embodiment, one of the fluid control valves is an electric valve 52, and the other is a relief valve 54. The electric valve 52 is electrically controlled to be open and closed so as to control the amount of gas flowing through the vapor passage 31. For purposes of further explanation, the gas contains the fuel vapor may also be referred to as "fluid" hereinafter. The electric valve 52 is opened and closed depending on control signals output from an engine control unit (ECU) 45. The relief valve 54 is disposed at a sub-passage bypassing the electric valve 52. The relief valve 54 is configured to open and close so as to maintain the internal pressure of the fuel tank 15 within an adequate range while the electric valve 52 is closed. The details of the closing valve 38 will be described later.

A purge valve 40 is disposed at the middle of the purge passage 32. The degree to which the purge valve 40 opens is controlled depending on the purge amount calculated by the ECU 45. The purge valve 40 includes a stepping motor capable of controlling the valve opening amount by controlling its stroke, i.e., the moving distance of a valve member. The purge valve 40 may include an electromagnetic valve having a solenoid such that the purge valve 40 is closed while power is not supplied and open while power is supplied.

The canister 34 is connected with one end of an atmospheric passage 42. The atmospheric passage 42 has the other end open to the atmosphere. An air filter 43 is disposed at the middle of the atmospheric passage 42.

The ECU 45 is connected to a lid switch 46, a lid opener 47 and a display 49 in addition to the tank internal pressure sensor 22, the purge valve 40, and the electric valve 52 of the closing valve 38. The lid opener 47 is linked to a lid manual opener (not shown) for manually opening a lid 48 that covers the oil filling port of the inlet pipe 16. The lid switch 46 outputs unlock signals to the ECU 45 for unlocking the lid 48. The lid opener 47 is a lock device for the lid 48. The lid opener 47 is configured to unlock the lid 48 when the lid opener 47 receives the unlock signals from the ECU 45 or when the lid manual opener is operated to open the lid 48.

Basic operations of the evaporative emission control system 12 will be described below. In a normal condition, the relief valve 54 of the closing valve 38 is closed.

The evaporative emission control system 12 in a state where the vehicle is parked will be described. While the vehicle is parked, the electric valve 52 of the closing valve 38 is kept in the closed state. Thus, the fuel vapor does not flow from the fuel tank 15 into the canister 34. Similarly, the air does not flow from the canister 34 into the fuel tank 15. In this state, the purge valve 40 is held at the closed state. While the electric valve 52 is closed during parking or the like, the relief valve 54 of the closing valve 38 opens depending on the internal pressure of the fuel tank 15 so as to control the internal pressure of the fuel tank 15 within the adequate range.

The evaporative emission control system 12 in a state where the vehicle is running will be described. When the predetermined purge condition is met during running, the ECU 45 carries out a purge control for purging the fuel vapor from the canister 34. During the purge control, the ECU 45 controls the purge valve 40 to be open and closed. When the purge valve 40 is opened, the intake negative pressure generated in the engine 14 acts on the canister 34 via the purge passage 32. Thus, the fuel vapor flows from the canister 34 into the air intake passage 27 together with the air introduced through the atmospheric passage 42, and is burnt in the engine 14. The ECU 45 opens the electric valve 52 of the closing valve 38 during purging the fuel vapor from the canister 34. Therefore, the internal pressure of the fuel tank 15 is kept in a range close to the atmospheric pressure.

The evaporative emission control system 12 in a state where fuel is supplied to the vehicle will be described. When the lid switch 46 is operated during parking, the ECU 45 opens the electric valve 52 of the closing valve 38. At this time, if the internal pressure of the fuel tank 15 is higher than the atmospheric pressure, the fuel vapor flows from the fuel tank 15 into the canister 34 via the vapor passage 31 and is trapped by the adsorbent in the canister 34, thereby preventing leakage of the fuel vapor into the atmosphere. This reduces the internal pressure of the fuel tank 15 to a value close to the atmospheric pressure. When the internal pressure of the fuel tank 15 decreases to the value close to the atmospheric pressure, the ECU 45 outputs the unlock signals to the lid opener 47 for unlocking the lid 48. After receiving the unlock signals, the lid opener 47 unlocks the lid 48, so the lid 48 can be opened. After the lid 48 is opened and the tank cap 17 is removed, fuel is supplied to the fuel tank 15. The ECU 45 keeps the electric valve 52 of the closing valve 38 in the open state until the refuel is ended, more specifically until the lid 48 is closed. Due to this configuration, the fuel vapor flows from the fuel tank 15 into the canister 34 via the vapor passage 31 and is adsorbed on the adsorbent in the canister 34 during refueling.

Figure 2:
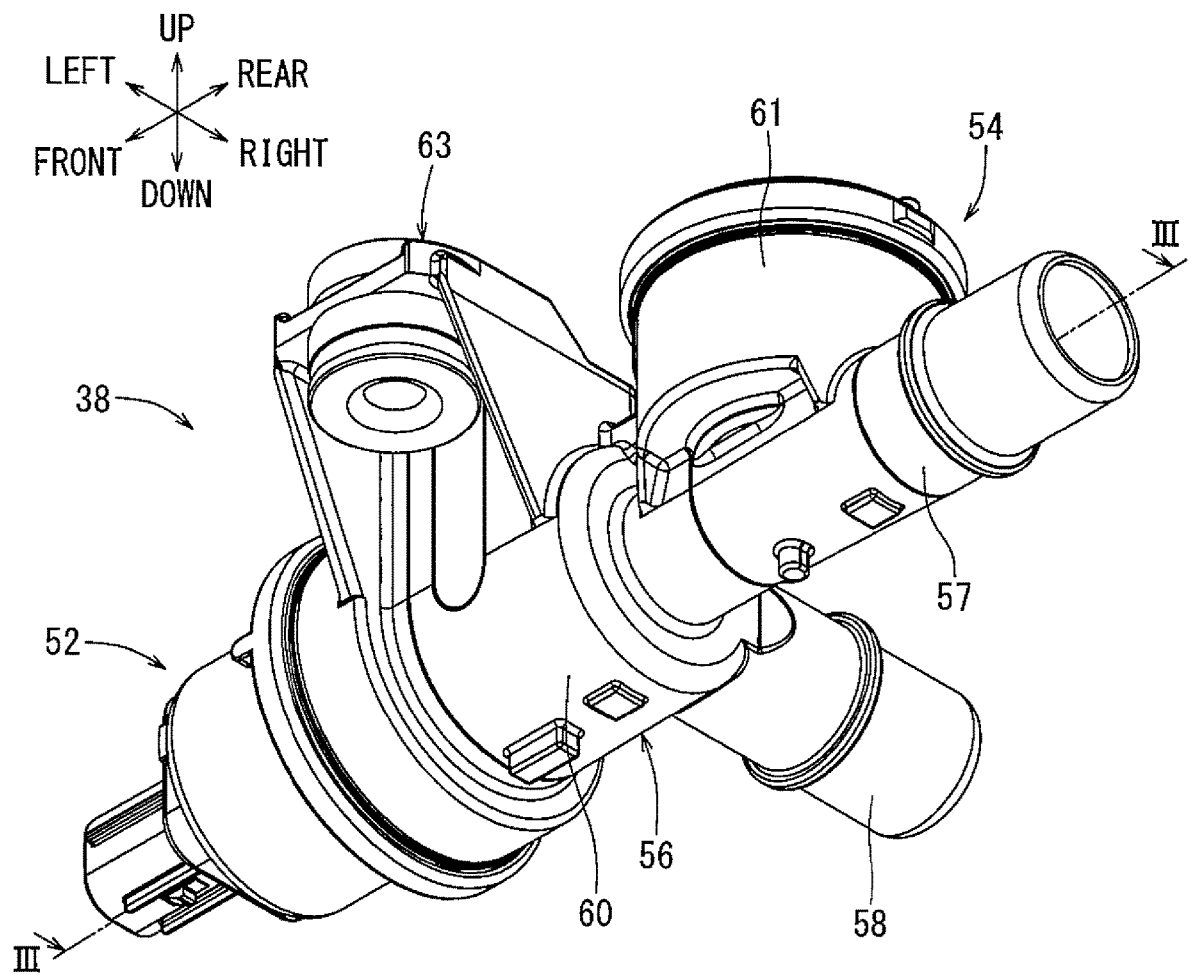
FIG. 2 is a perspective view of a closing valve installed in the evaporative emission control system of FIG. 1.

Next, the closing valve 38 will be described. As shown in FIG. 2, the closing valve 38 includes the electric valve 52, the relief valve 54, and a valve casing 56. The electric valve 52 and the relief valve 54 are attached to the valve casing 56. The closing valve 38 is usually mounted under a vehicle floor. So, directions of the closing valve 38 shown in each drawing are based on forward, backward, rightward, leftward, upward and downward directions of the vehicle. However, these directions are not intended to limit the installation orientation of the closing valve 38.

As shown in FIG. 2, the valve casing 56 includes an upstream pipe part 57, a downstream pipe part 58, a first cylindrical compartment 60, and a second cylindrical compartment 61. The valve casing 56 is made from a resin material.

Figure 4:
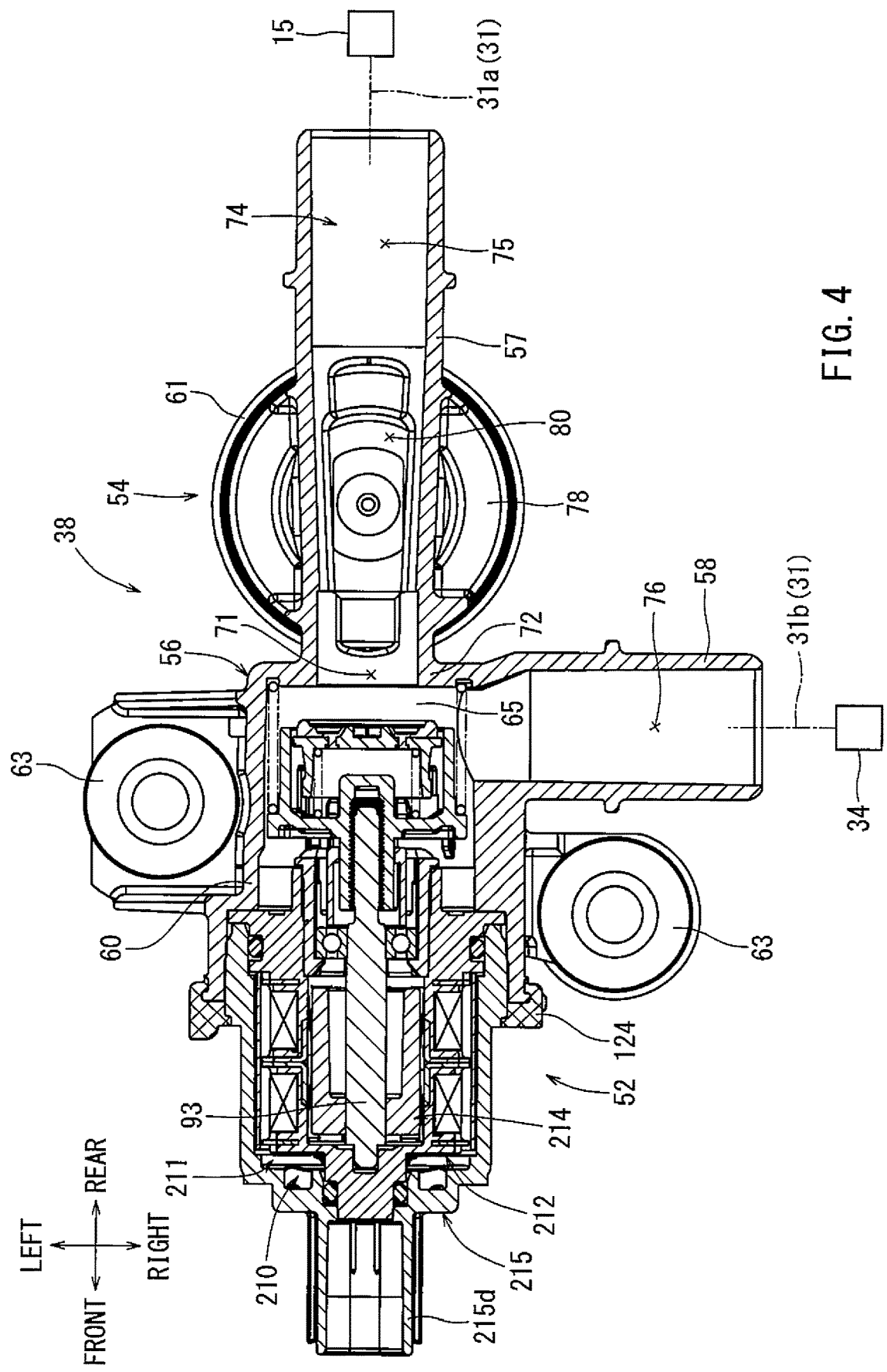
FIG. 4 is a cross-sectional view of the closing valve of FIG. 2 taken in section IV-IV of FIG. 3.

As shown in FIG. 4, the upstream pipe part 57 defines an upstream passage 75 therein. The downstream pipe part 58 defines a downstream passage 76 therein. The upstream passage 75, the downstream passage 76, and a part of the inside of the first cylindrical compartment 60 collectively define a main passage 74 having an L-shape.

Each of the upstream pipe part 57 and the downstream pipe part 58 has a hollow cylindrical shape. The upstream pipe part 57 is disposed in back of the first cylindrical compartment 60 and extends in the front-rear direction. The downstream pipe part 58 is disposed on the right of the first cylindrical compartment 60 and extends in the right-left direction.

The first cylindrical compartment 60 has a stepped hollow cylindrical shape extending forward from a front end of the upstream pipe part 57. The first cylindrical compartment 60 has the outer diameter that increases toward the front side. The upstream pipe part 57 and the first cylindrical compartment 60 are concentrically arranged. The first cylindrical compartment 60 defines a first valve chamber 65 therein.

The upstream pipe part 57 has substantially the same inner diameter with the downstream pipe part 58. The upstream pipe part 57 is in fluid communication with the downstream pipe part 58 via the first valve chamber 65. A downstream end, i.e., a front end of the upstream pipe part 57 forms a first valve opening 71 that is open to the first valve chamber 65. A periphery of the first valve opening 71 defines a first valve seat 72. When the elects is valve 52 contacts the valve seat 72, the first valve opening 71 is closed.

Figure 3:
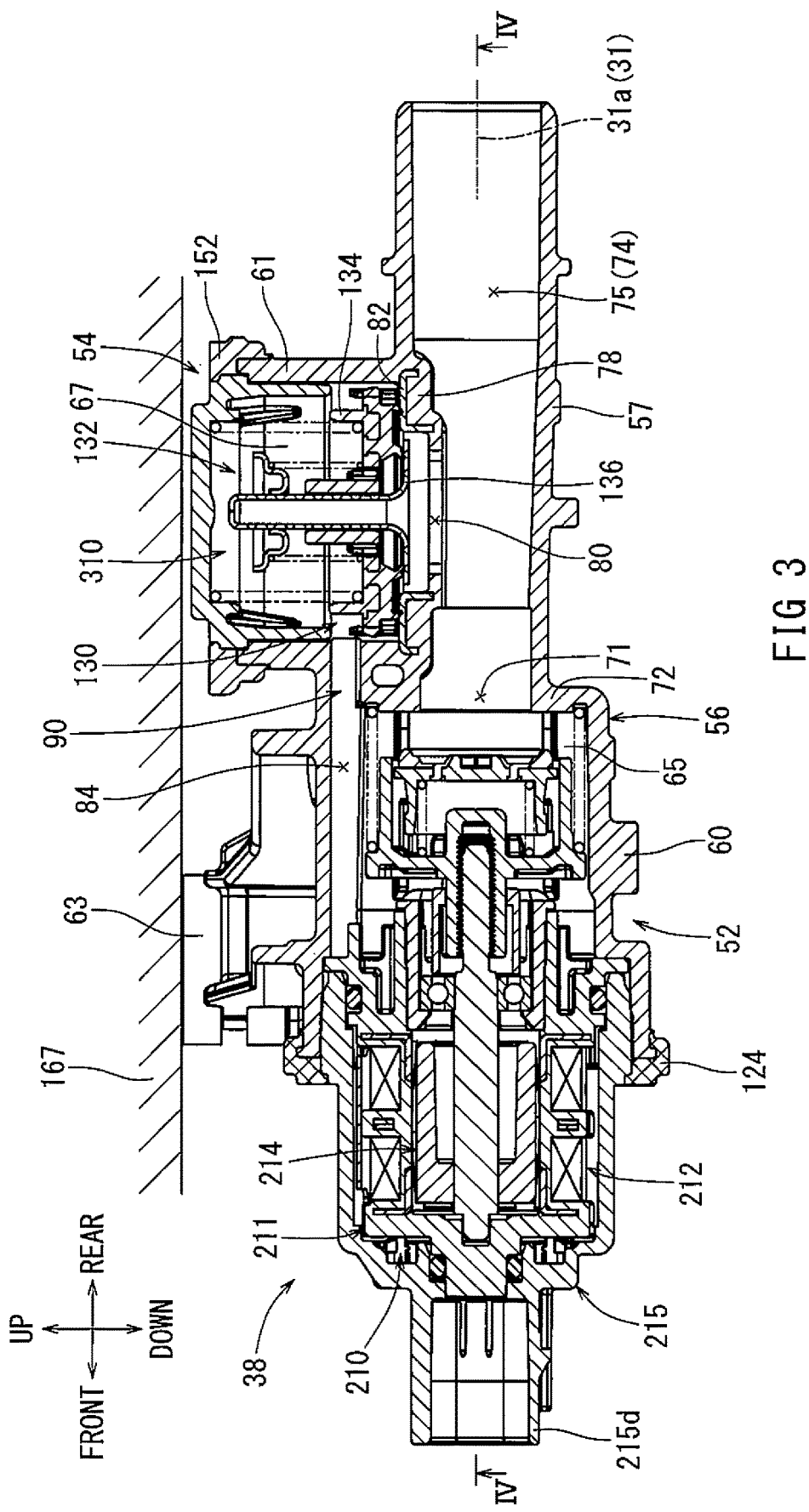
FIG. 3 is a cross-sectional view of the closing valve of FIG. 2 taken in section III-III of FIG. 2.

As shown in FIG. 3, the second cylindrical compartment 61 is disposed above the upstream pipe part 57 and has a hollow cylindrical shape. As shown in FIG. 4, a diameter of the second cylindrical compartment 61 is about twice as large as that of the upstream pipe part 57. The central axis of the second cylindrical compartment 61 is positioned right above the central axis of the upstream pipe part 57. As shown in FIG. 3, the second cylindrical compartment 61 defines a second valve chamber 67 therein.

As shown in FIG. 3, a lower end of the second cylindrical compartment 61 has a concentric stepped part 78 that decreases the inner diameter of the second cylindrical compartment 61. A central hole of the stepped part 78 defines a second valve opening 80 that provides fluid communication between the second valve chamber 67 and the upstream passage 75. The second valve opening 80 is opened and closed by the relief valve 54. The stepped part 78 includes concentrically arranged second valve seat 82 made of a metal annular plate. The second valve seat 82 is partially seated in the stepped part 78.

The valve casing 56 defines a communication passage 84 that provides fluid communication between the first valve chamber 65 and the second valve chamber 67. The communication passage 84, the first valve chamber 65, and the second valve chamber 67 containing the second valve opening 80 form a bypass passage 90 that bypasses the first valve opening 71 of the main passage 74.

As shown in FIG. 4, the valve casing 56 has a pair of right and left attachment parts 63 for fixing the closing valve 38 on the floor of the vehicle from below. The attachment parts 63 are integral with the first cylindrical compartment 60. As shown in FIG. 3, the attachment parts 63 are fixed on an installation member 167 of the vehicle floor by bolts or the like.

Figure 5:
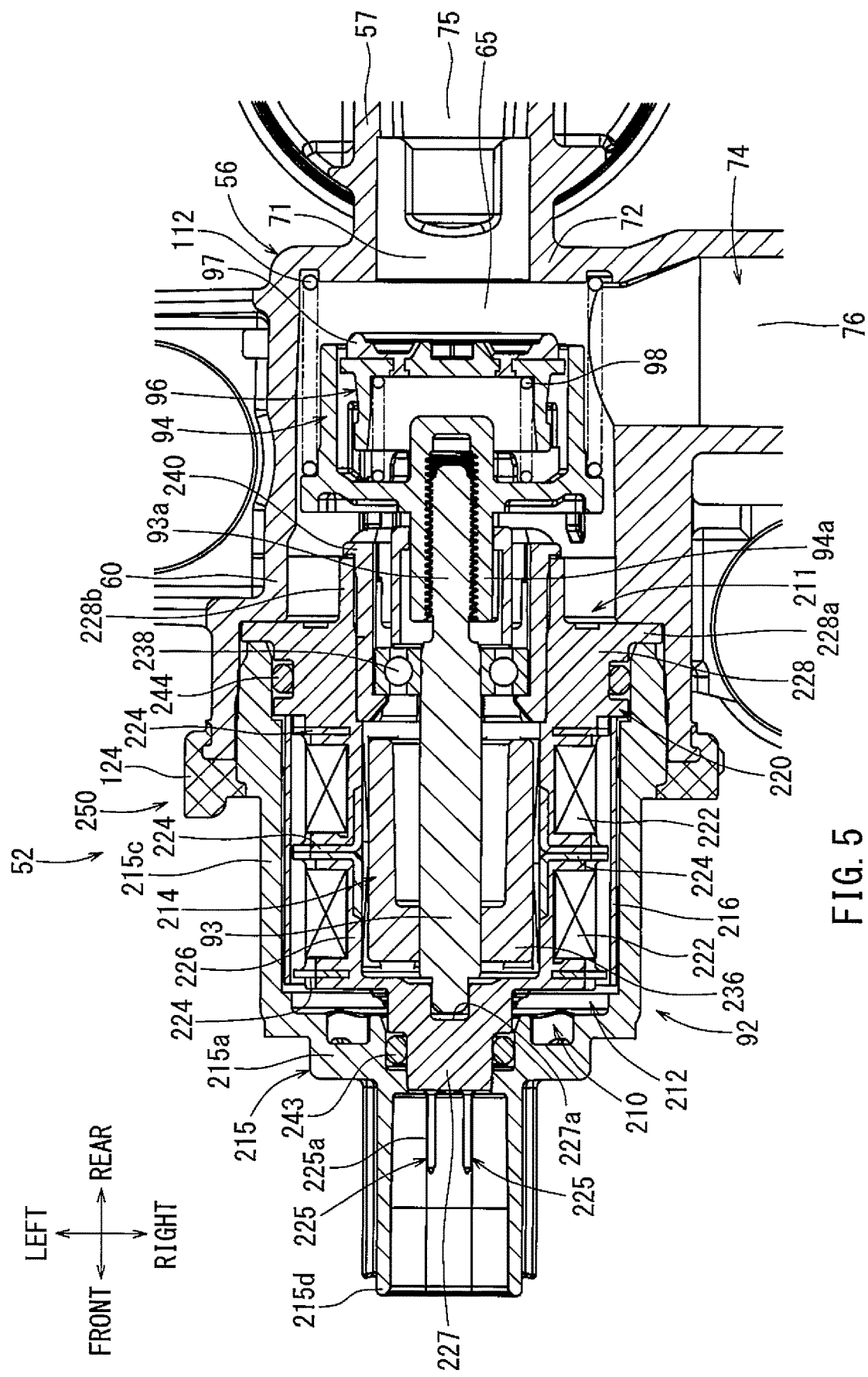
FIG. 5 is an enlarged cross-sectional view of an electric valve of the closing valve of FIG. 2.
Figure 6:
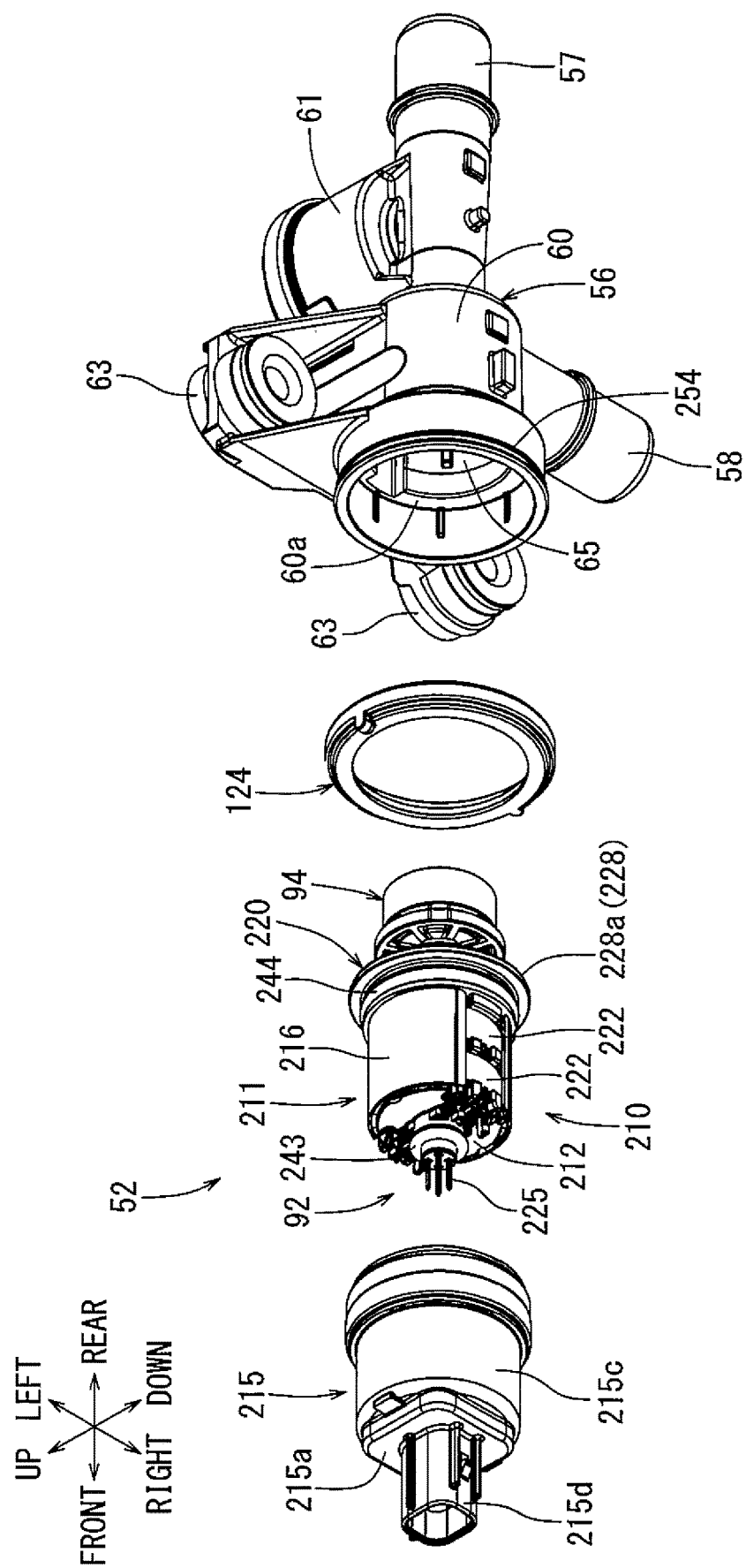
FIG. 6 is a perspective, exploded view of the electric valve of FIG. 5.

Next, the structure of the electric valve 52 will be described. As shown in FIGS. 5 and 6, the electric valve 52 includes a first valve unit 210. As described above, the electric valve 52 corresponds to "fluid control valve".

As shown in FIG. 5, the first valve unit 210 includes an electric motor 92, a valve guide 94, and a valve member 96. The valve guide 94 and the valve member 96 are housed in the first cylindrical compartment 60. Here, the electric valve 52 drawn in FIG. 5 is in the open state.

The electric motor 92 is a stepping motor. As shown in FIG. 5, the electric motor 92 has a motor body 211 and a motor cover 215 housing the motor body 211 therein. The motor body 211 has an output shaft 93 extending in the front-rear direction.

The motor body 211 has a stator 212 and a rotor 214. The stator 212 includes a bobbin 220 and coils 222. The bobbin 220 includes four yokes 224, four terminals 225, and a resin part that is made from a resin material. The yokes 224 and the terminals 225 are integrated with each other by molding the resin part. The resin part of the bobbin 220 forms a bobbin body 226, a fitting projection 227, and a fitting cylinder part 228.

The bobbin body 226 has a substantial hollow pipe shape. The fitting projection 227 has a stepped cylindrical shape having an outer diameter that decreases moving toward the front, and is disposed in front of the bobbin body 226 to close a front end of the bobbin body 226. The fitting projection 227 has a bearing recess 227a at a center portion of a rear surface thereof.

The fitting cylinder part 228 has a hollow cylindrical shape at the rear end of the bobbin body 226. The fitting cylinder part 228 has a support part 228a and a sleeve part 228b. The support part 228a has a ring shape extending radially outward from a rear end of the fitting cylinder part 228. The sleeve part 228b has a hollow cylindrical shape extending rearward from an inner circumferential portion of the rear end of the fitting cylinder part 228.

Each of the yokes 224 is made of a metal plate such as an iron plate and is shaped by press-molding. Each yoke 224 has an annular plate portion and a plurality (e.g., six) of tapered-shaped magnetic pole teeth bent from an inner circumference of the annular plate portion at approximately right angles. The four yokes 224 are divided into two pairs. Each pair of yokes 224 are combined and arranged such that the magnetic pole teeth mesh with each other.

Each of the terminals 225 is made of a metal plate such as an iron plate and is shaped by press-molding. A basal portion of each terminal 225 is seated in the bobbin body 226 and the fitting projection 227. Each terminal 225 includes a pin part 225a protruding forward from the fitting projection 227.

The coils 222 are wound around the bobbin body 226 in two spaces that are formed along the axial direction of the bobbin body 226. The coils 222 are composed of coil wires, each wire being connected to the corresponding terminal 225.

The stator 212 is provided with an auxiliary magnetic member 216. The auxiliary magnetic member 216 is made of a magnetic plate rolled to have a C-shaped cross-section. The stator 212 is fitted into the auxiliary magnetic member 216 by press fitting such that the auxiliary magnetic member 216 covers an outer circumference of the stator 212.

The rotor 214 includes the output shaft 93 and magnets 236. The output shaft 93 is made from a metal material and has a threaded shaft part 93a at a rear end thereof. The magnets 236 are attached to a front portion of the output shaft 93. The magnets 236 are arranged such that N-poles and S-poles of the magnets 236 are alternately aligned in the circumferential direction and such that the number of N-poles and S-poles corresponds to the number of magnetic pole teeth of each yoke 224 of the stator 212.

A central portion of the output shaft 93 is rotatably supported by a retainer 240 via a bearing 238. In this embodiment, the bearing 238 is a ball bearing.

The rotor 214 is housed in the stator 212. The bearing recess 227a of the bobbin 220 rotatably supports a front end of the output shaft 93. The retainer 240 is fitted into the fitting cylinder part 228 of the bobbin 220. Thus, the bobbin 222 rotatably supports the rotor 214.

The valve guide 94 is made from a resin material and has a short hollow cylindrical shape having a closed front end and an open rear end. The valve guide 94 includes a concentric, externally threaded cylindrical part 94a. The threaded cylindrical part 94a has a hollow cylindrical shape including a threaded inner surface and is threadedly engaged with the threaded shaft part 93a of the output shaft 93. Thus, the threaded cylindrical part 94a can move in the axial direction relative to the retainer 240 and is prevented from rotating about its axis.

The valve guide 94 houses the valve member 96. The valve member 96 can move in the axial direction, i.e., the front-rear direction, relative to the valve guide 94 within a predetermined range. The valve member 96 is made from a resin material and has a short hollow cylinder shape with an open front end and a closed rear end. A valve spring 98 is disposed between opposite surfaces of the valve guide 94 and the valve body 96. In this embodiment, the valve spring 98 is a coil spring. The valve spring 98 biases the valve member 96 in the closing direction, i.e., in the rearward direction. The valve member 96 is provided with a first valve seal 97 at a rear end surface thereof. The first valve seal 97 is made from a rubber-like elastic material and has a ring shape.

As shown in FIG. 5, the motor cover 215 has a hollow stepped cylindrical shape with an outer diameter that generally decreasing moving toward the front. The motor cover 215 is made from a resin material. The motor cover 215 includes an end wall part 215a, a cylindrical wall part 215c, and connector part 215d. The cylindrical wall part 215c has a hollow stepped cylindrical shape. The end wall part 215a is formed at the front end of the cylindrical wall part 215c in an annular shape having a through hole for narrowing a front opening of the cylindrical wall part 215c. The connector part 215d has a short pipe shape extending forward from a front surface of the end wall part 215a. The stator 212 of the motor body 211 is inserted into and housed in the motor cover 215.

The fitting projection 227 of the bobbin 220 extends into the through hole of the end wall part 215a. Thus, the pin parts 225a of the terminals 225 are positioned in the connecter part 215d. An O-ring 243 is provided between the end wall part 215a and the fitting projection 227.

The fitting cylinder part 228 of the bobbin 220 is fitted into the rear end of the cylindrical wall part 215c of the motor cover 215. The support part 228a of the fitting cylinder part 228 abuts a rear end surface of the cylindrical wall part 215c. An O-ring 244 is disposed between the motor cover 215 and the fitting cylinder part 228. Each of the O-rings 243, 244 is made from a rubber-like elastic material.

As shown in FIG. 5, the first valve unit 210 is installed in the first cylindrical compartment 60 of the valve casing 56 such that the valve guide 94 and the valve member 96 are concentrically arranged in the first valve chamber 65. The valve guide 94 and the first valve seal 97 of the valve member 96 are positioned so as to come into and out of contact with the first valve seat 72. An auxiliary spring 112 is provided between the first valve seat 72 and the valve guide 94. The auxiliary spring 112 is a coil spring that biases the valve guide 94 away from the first valve seat 72.

The rear end of the cylindrical wall part 215c of the motor cover 215 is fitted into the front end of the first cylindrical compartment 60 of the valve casing 56. A ring-shaped first connection member 124 is disposed around the front end of the first cylindrical compartment 60. The first connection member 124 firmly engages with both the cylindrical compartment 60 and the cylindrical wall part 215c so as to retain and secure the connection therebetween.

Figure 9:
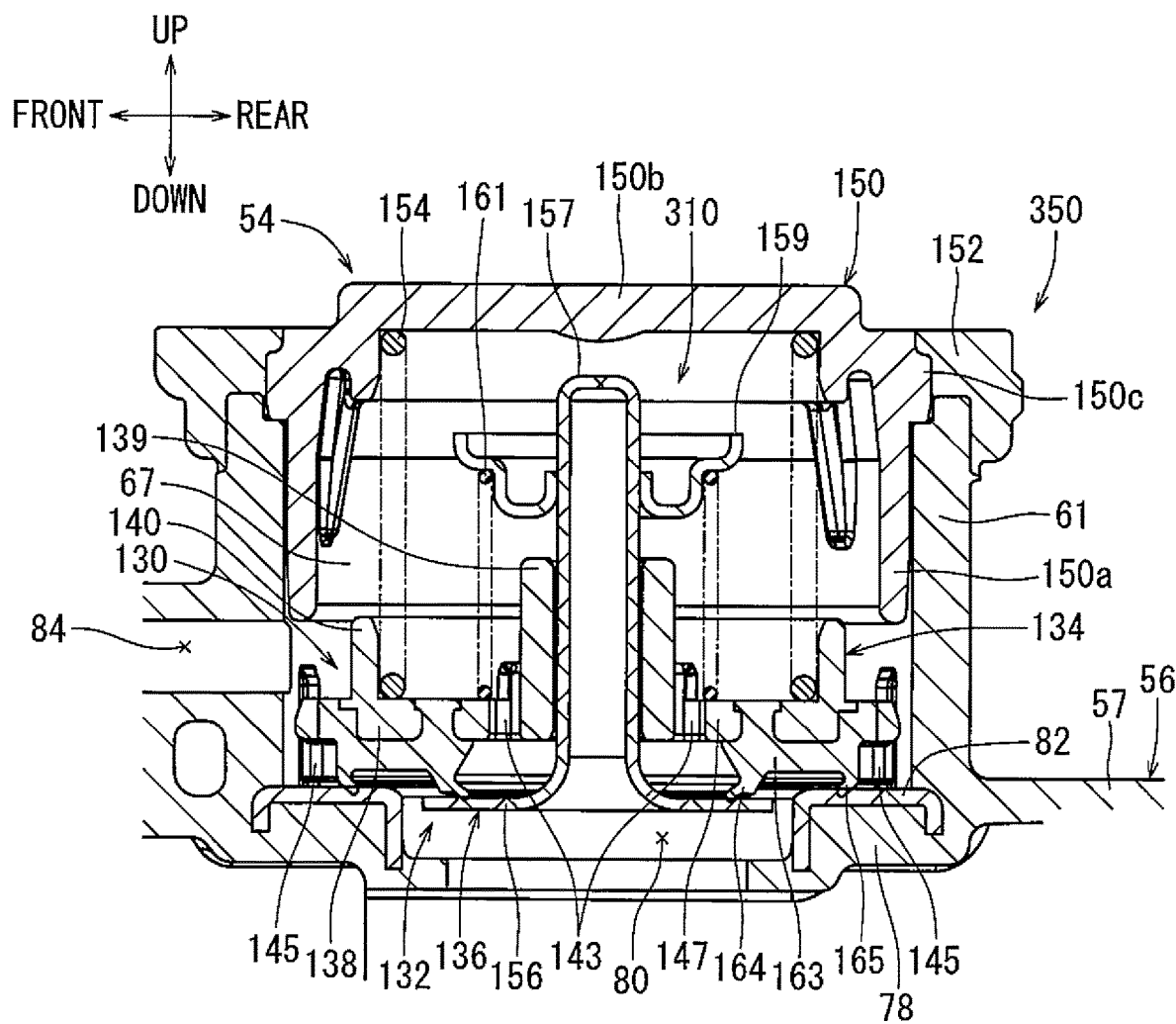
FIG. 9 is a cross-sectional view of a relief valve of the closing valve of FIG. 2.
Figure 10:
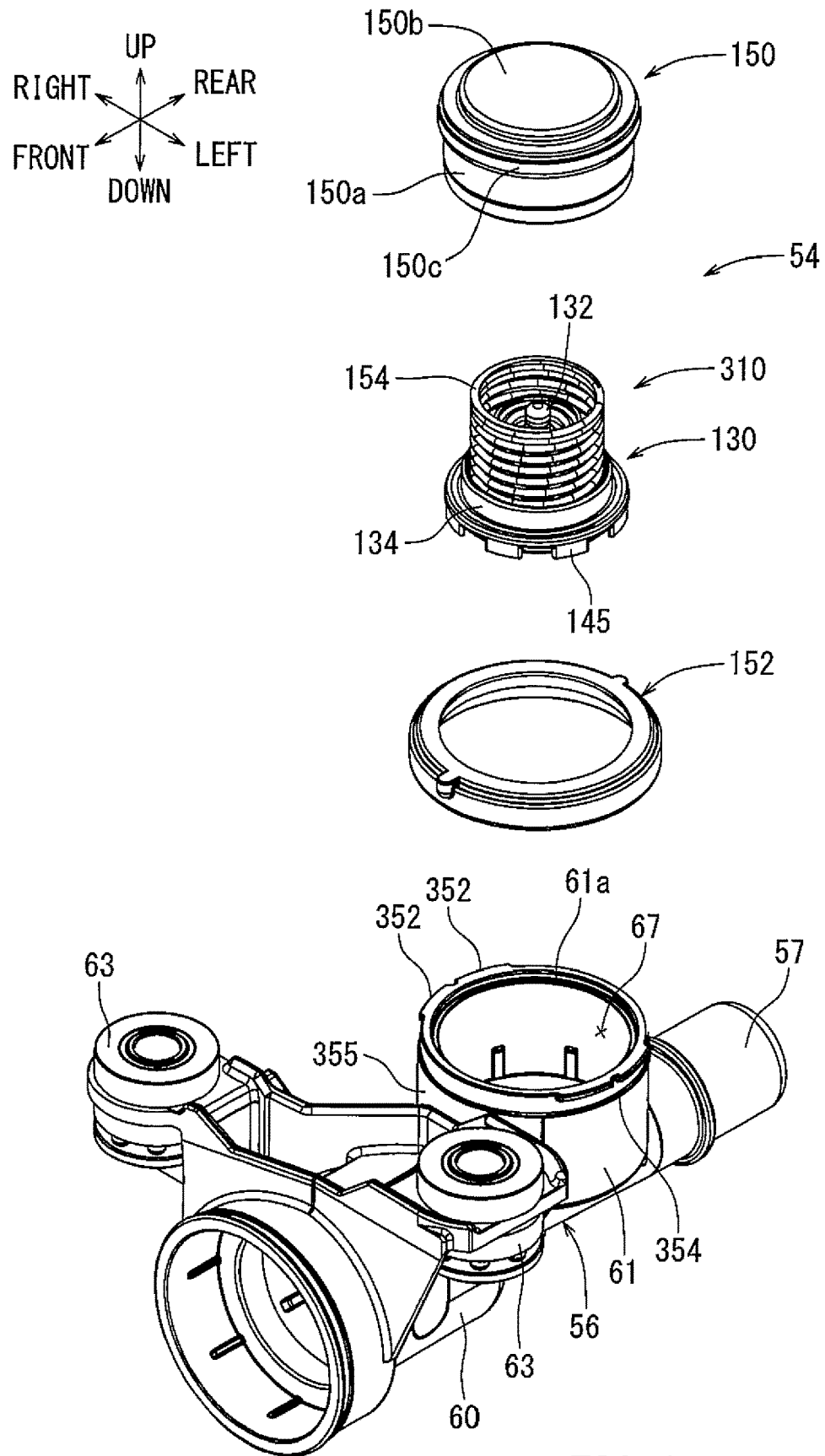
FIG. 10 is a perspective, exploded view of the relief valve of FIG. 9.

Next, the structure of the relief valve 54 will be described. As shown in FIGS. 9 and 10, the relief valve 54 includes a second valve unit 310. As described above, the relief valve 54 corresponds to "fluid control valve".

As shown in FIG. 10, the second valve unit 310 includes a positive pressure relief valve structure 130 and a negative pressure relief valve structure 132. The positive pressure relief valve structure 130 and the negative pressure relief valve structure 132 are concentrically arranged. As shown in FIG. 9, the second valve unit 310 is housed in the second cylindrical compartment 61 of the valve casing 56. Each of the relief valve structures 130, 132 shown in FIG. 9 is in the closed state.

An open end, i.e., an upper end of the second cylindrical compartment 61 is fitted with and closed by a cap 150. In this embodiment, the cap 150 is made from a resin material. The cap 150 includes a cylindrical part 150a and a lid part 150b. The cylindrical part 150a has a short hollow cylindrical shape. The lid part 150b has a circle plate shape and closes an upper end of the cylindrical part 150a. The cap 150 has a flange part 150c having a ring shape that protrudes radially outward from an upper end portion of the cylindrical part 150a. The length of the flange part 150c in the axial direction, i.e., in the vertical direction is longer than the protruding dimension thereof in the radial direction.

A ring-shaped second connection member 152 is disposed around the upper end of the second cylindrical compartment 61 and the flange part 150c. The second connection member 152 firmly engages with the second cylindrical compartment 61 and the cap 150 so as to retain and secure the connection therebetween.

The positive pressure relief valve structure 130 includes a positive pressure valve member 134. The negative pressure relief valve structure 132 includes a negative pressure valve member 136. The positive pressure valve member 134 and the negative pressure valve member 136 are concentrically arranged in the second valve chamber 67 of the second cylindrical compartment 61 and are movable in the vertical direction.

The positive pressure valve member 134 includes a first valve plate 138, an inner cylinder part 139, and an outer cylinder part 140. The plate 138 and parts 139, 140 are concentrically arranged. The first valve plate 138 has an annular plate shape. Each of the inner cylinder part 139 and the outer cylinder part 140 has a hollow cylindrical shape. The inner cylinder part 139 is positioned in the outer cylinder part 140 to form double cylinder structure. The inner cylinder part 139 and the outer cylinder part 140 are installed upright on the first valve plate 138. An outer circumferential portion of the first valve plate 138 is positioned right above the second valve seat 82. When the positive pressure valve member 134 is spaced apart from the second valve seat 82, the second valve opening 80 is open. When the positive pressure valve member 134 abuts the second valve seat 82, the second valve opening 80 is closed by the positive pressure valve member 134.

The first valve plate 138 has a plurality (two shown in FIG. 9) of communication holes 143 extending through the first valve plate 138 in the vertical direction. The communication holes 143 are positioned radially outside the inner cylinder part 139. A lower surface of an outer circumferential edge of the first valve plate 138 is provided with a plurality of uniformly circumferentially-spaced stoppers 145. While the positive pressure valve member 134 is in the valve closed state, the stoppers 145 abut the second valve seat 82, thereby defining the closing valve position of the positive pressure valve member 134. An inner circumferential portion of the first valve plate 138 serves as a third valve seat 147 for the negative pressure valve member 136 of the negative pressure relief valve structure 132.

A positive pressure spring 154 is concentrically disposed between opposite surfaces of the first valve plate 138 of the positive pressure valve member 134 and the cap 150. In this embodiment, the positive pressure spring 154 is a coil spring. The positive pressure spring 154 biases the positive pressure valve member 134 downward, i.e., in the closing direction. The positive pressure spring 154 is radially positioned inside the outer cylinder part 140 of the positive pressure valve member 134.

The negative pressure valve member 136 includes a second valve plate 156 and a shaft part 157. The second valve plate 156 has an annular plate shape. The shaft part 157 has a cylindrical shape extending upward from an inner circumference of the second valve plate 156. The shaft part 157 is inserted into the inner cylinder part 139 of the positive pressure valve member 134 and is slidable in the axial direction. When the second valve plate 156 is spaced apart from the third valve seat 147 of the positive pressure valve member 134, the communication holes 143 are open. When the second valve plate 156 abuts the third valve seat 147, the communication holes 143 are closed by the second valve plate 156. An upper end of the shaft part 157 is provided with a ring-shaped spring retainer 159. When the negative pressure valve member 136 moves downward by a predetermined distance, the spring retainer 159 comes into contact with the inner cylinder part 139, thereby defining the maximum opening amount of the negative pressure valve member 136.

A negative pressure spring 161 is concentrically disposed between opposite surfaces of the first valve plate 138 of the positive pressure valve 134 and the spring retainer 159. In this embodiment, the negative pressure spring 161 is a coil spring. The negative pressure spring 161 is disposed around the inner cylinder part 139 and radially positioned outside the communication holes 143. The negative pressure spring 161 biases the negative pressure valve member 136 upward, i.e., in the valve closing direction. The negative pressure spring 161 is located in the positive pressure spring 154. The negative pressure spring 161 has a smaller coil diameter, a shorter coil length, and is formed by a smaller diameter wire than the positive pressure spring 154. Thus, the biasing force of the negative pressure spring 161 is less than that of the positive pressure spring 154.

A second valve seal 163 is attached to a lower surface of the first valve plate 138 of the positive pressure valve member 134. The second valve seal 163 is made from an elastic material such as rubber. The second valve seal 163 has a ring shape including an inner seal part 164 and an outer seal part 165. Each of the inner seal part 164 and the outer seal part 165 has an annular shape and protrudes downward from a lower surface of the second valve seal 163. The inner seal part 164 is concentrically arranged in the outer seal part 165. When the negative pressure valve member 136 is in the closed state, the second valve plate 156 elastically abuts, i.e., is in close contact with the inner seal part 164. When the positive pressure valve member 134 is in the closed state, the second valve seat 82 elastically abuts, i.e., is in close contact with the outer seal part 165.

The valve open pressure on the positive pressure side is determined depending on characteristics of the positive pressure spring 154. When the pressure in the upstream passage 75 exceeds the valve open pressure on the positive pressure side, the positive pressure valve member 134 moves upward, i.e., in the valve opening direction against the biasing force of the positive pressure spring 154. Consequently, the outer seal part 165 separates from the second valve seat 82, so that the positive pressure relief valve structure 130 is opened.

The valve open pressure on the negative pressure side is determined depending on characteristics of the negative pressure spring 161. When the pressure in the upstream passage 75 falls below the valve open pressure on the negative pressure side, the negative pressure valve member 136 moves downward, i.e., in the valve opening direction against the biasing force of the negative pressure spring 161. Consequently, the second valve plate 156 of the negative pressure valve member 136 separates from the inner seal part 164, thereby opening the negative pressure relief valve structure 132 is opened.

As shown in FIG. 3, the closing valve 38 is mounted on the vehicle by fixing the attachment parts 63 of the valve casing 56 on the installation member 167 of the vehicle floor with bolts or the like.

As shown in FIG. 1, the closing valve 38 is disposed between the tank-side passage 31a and the canister-side passage 31b of the evaporative emission control system 12 installed on the vehicle. That is, as shown in FIG. 4, the upstream pipe part 57 of the valve casing 56 is connected with the tank-side passage 31a. The downstream pipe part 58 is connected with the canister-side passage 31b. Thus, the tank-side passage 31a is in fluid communication with the canister-side passage 31b via the main passage 74 of the valve casing 56. The connector part 215d of the motor cover 215 is coupled with an external connector linked to the ECU 45 that is configured to control the motor body 211.

Next, operation of the electric valve 52 will be described. The electric valve 52 is operated in a state where the positive pressure relief valve structure 130 and the negative pressure relief valve structure 132 of the relief valve 54 are in the closed state.

The ECU 45 drives the electric motor 92 so as to rotate the output shaft 93 in the forward direction or the reverse direction, thereby moving the valve guide 94 and the valve member 96 forward or backward in the axial direction depending on the rotational direction of the output shaft 93. When the valve member 96 abuts the first valve seat 72 of the valve casing 56, the first valve opening 71 is closed by the valve member 96. When the valve member 96 is apart from the first valve seat 72, the first valve opening 71 is open.

More specifically, during opening operation of the electric valve 52, the valve guide 94 moves forward, and thus separates from the first valve seat 72 of the valve casing 56. Then, the valve member 96 moves forward together with the valve guide 94, so the first valve seal 97 separates from the first valve seat 72. As a result, the upstream passage 75 of the main passage 74 is in fluid communication with the downstream passage 76.

During closing operation of the electric valve 52, the valve member 96 moves rearward together with the valve guide 94, so the first valve seal 97 comes into contact with the first valve seat 72 of the valve casing 56. Then, the valve guide 94 comes into contact with the first valve seat 72 of the valve casing 56. Thus, the fluid communication between the upstream passage 75 and the downstream passage 76 of the main passage 74 is blocked.

Next, operation of the relief valve 54 will be described. Each of the positive pressure relief valve structure 130 and the negative pressure relief valve structure 132 is opened in a state where the electric valve 52 is in the closed state.

When the internal pressure of the fuel tank 15 exceeds the valve open pressure of the positive pressure relief valve structure 130, the positive pressure relief valve structure 130 is opened. As a result, the upstream passage 75 is in fluid communication with the downstream passage 76 via the bypass passage 90, so the fluid flows from the fuel tank 15 into the canister 34 via the bypass passage 90, thereby decreasing the internal pressure of the fuel tank 15.

When the internal pressure of the fuel tank 15 falls below the valve open pressure of the negative pressure relief valve structure 132, the negative pressure relief valve structure 132 is opened. As a result, the upstream passage 75 is fluidly communicated with the downstream passage 76 via the bypass passage 90, so the fluid flows from the canister 34 into the fuel tank 15 via the bypass passage 90, thereby increasing the internal pressure of the fuel tank 15.

Figure 7:
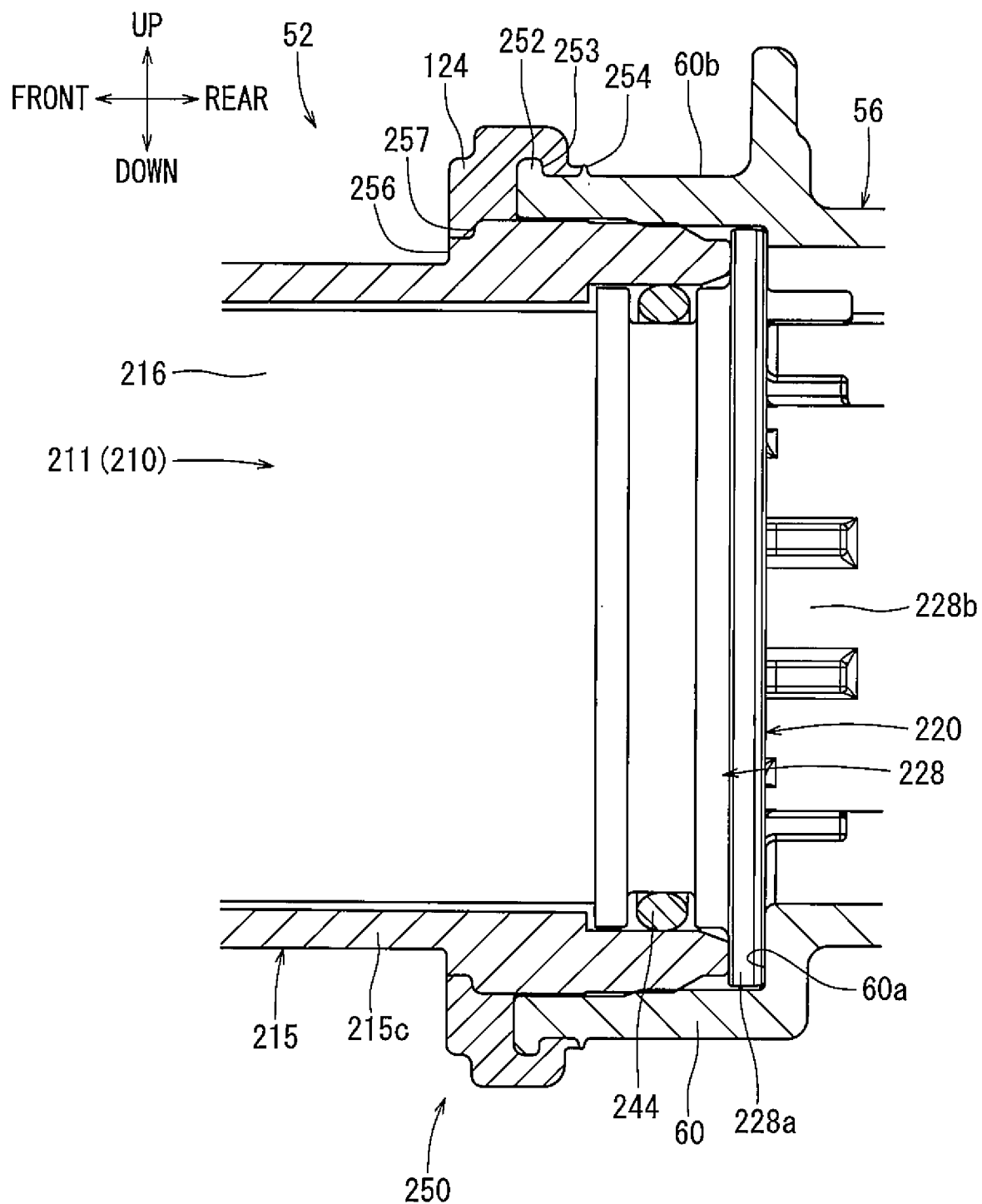
FIG. 7 is a cross-sectional view of a connection structure between the valve casing and the motor cover of the electric valve of the electric valve of FIG. 5.

As shown in FIG. 7, the valve casing 56 and the motor cover 215 form a first valve housing 250. In this disclosure, the valve casing 56 corresponds to "first half". The first cylindrical compartment 60 of the valve casing 56 corresponds to "first connection pipe part". The motor cover 215 corresponds to "second half". The cylindrical wall part 215c of the motor cover 215 corresponds to "second connection pipe part".

The first cylindrical compartment 60 of the valve casing 56 has a stepped part 60a along the inner surface thereof. The stepped part 60a has a substantially annular shape and extends radially so as to be capable of supporting the support part 228a of the bobbin 220. When the support part 228a of the bobbin 220 is inserted into the first cylindrical compartment 60, the rear end of the cylindrical wall part 215c of the motor cover 215 is fitted into the first cylindrical compartment 60. Thus, the support part 228a is held between the stepped part 60a of the first cylindrical compartment 60 and the rear end of the cylindrical wall part 215c. In this disclosure, the support part 228a corresponds to "separate member".

The first cylindrical compartment 60 has an engagement part 252 at a front end thereof. The engagement part 252 has a ring shape and protrudes radially outward. The engagement part 252 has a square cross-sectional shape along the central axis thereof. A rear surface of the engagement part 252 is a retaining surface 253. In this disclosure, the retaining surface 253 corresponds to "first engagement part".

As shown in FIG. 7, the first cylindrical compartment 60 has a fine projection 254 extending circumferentially about an outer circumferential surface 60b of the first cylindrical compartment 60. The fine projection 254 is axially positioned at the back of the engagement part 252 at a predetermined interval. The fine projection 254 extends circumferentially along a rear edge of the first connection member 124. The fine projection 254 has a triangle cross-section that tapers radially outward. The fine projection 254 is plastically deformable in a radially inward direction. In this disclosure, the fine projection 254 corresponds to "projection".

The cylindrical wall part 215c of the motor cover 215 has a stepped surface 256 facing forward. The stepped surface 256 has a ring shape and extends radially from an outer circumferential surface of the cylindrical wall part 215c. The stepped surface 256 is in front of the front end of the first cylindrical compartment 60 at a predetermined interval in the axial direction. The cylindrical wall part 215c of the motor cover 215 has a retained surface 257. The retained surface 257 has an annular shape and extends radially from the outer circumferential surface of the cylindrical wall part 215c such that the retained surface 257 faces forward. The retained surface 257 is axially positioned at the back of the stepped surface 256 at a predetermined interval. In this disclosure, the retained surface 257 corresponds to "second engagement part".

The first connection member 124 is secondarily molded by molding a resin material around the whole circumferences of both the first cylindrical compartment 60 and the cylindrical wall part 215c. The first connection member 124 is formed to surround and encapsulate therein, i.e., cover both the retained surface 257 and the engagement part 252 containing the retaining surface 253. The first connection member 124 engages the engagement part 252 with the retained surface 257 so as to prevent the first cylindrical compartment from being detached from the cylindrical wall part 215c. A rear end of the first connection member 124 extends to the fine projection 254. In this disclosure, the first connection member 124 corresponds to "secondary molded member". Each of the valve casing 56 and the motor cover 215 correspond to "primary molded member".

Figure 8:
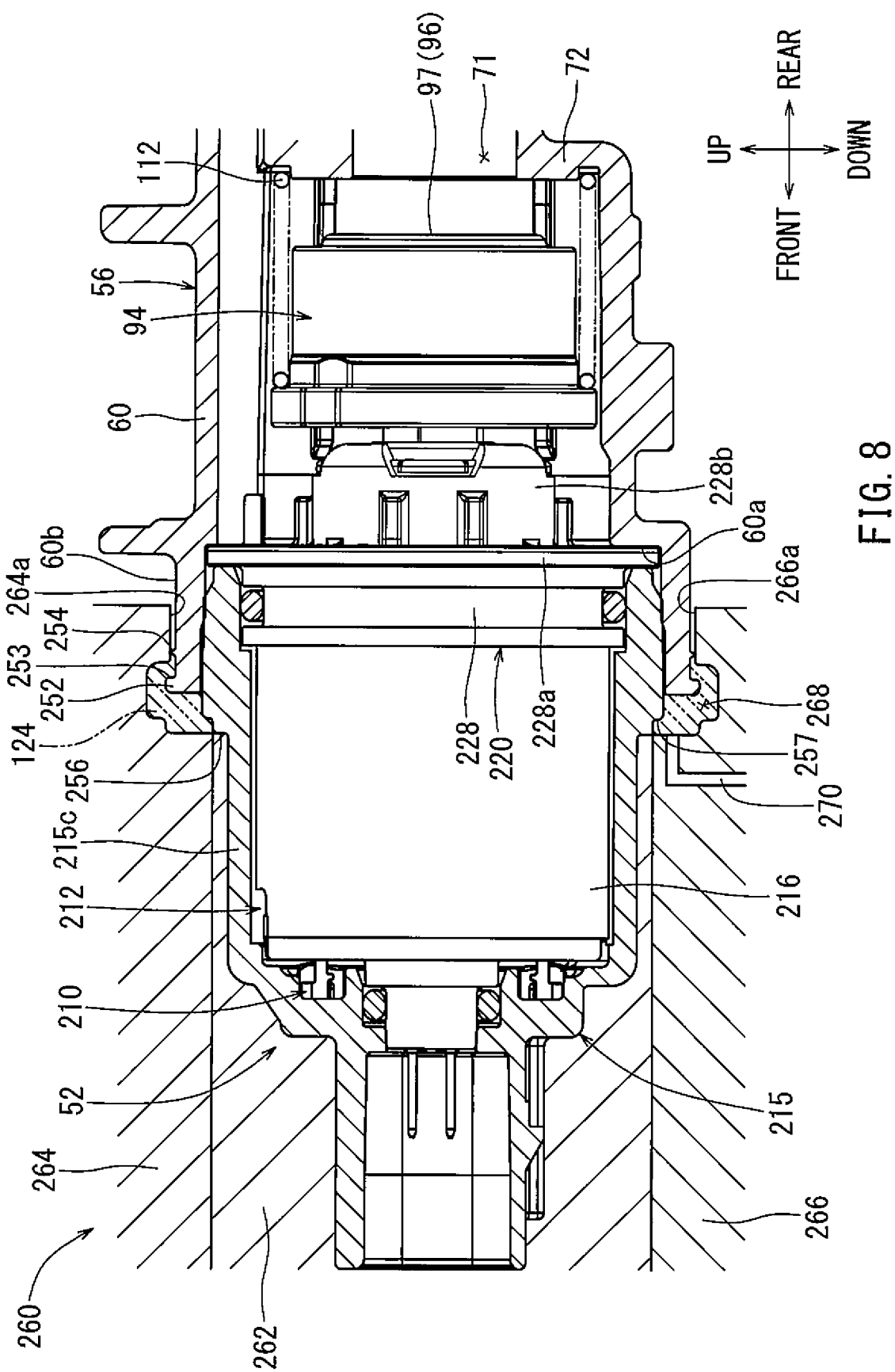
FIG. 8 is a cross-sectional view illustrating molds for a first connection member of the electric valve of FIG. 5.

FIG. 8 shows a cross-section of a first mold set 260 for molding the first connection member 124. The directions shown in FIG. 8 are based on the directions of the closing valve 38, but do not limit arrangement orientation of the first mold set 260.

As shown in FIG. 8, the first mold set 260 includes a front mold 262, an upper mold 264, and a lower mold 266. The front mold 262 moves in the front-back direction. Each of the upper mold 264 and the lower mold 266 moves in the vertical direction.

The first mold set 260 has a fixing mold (not shown) for holding the valve casing 56. When the first mold set 260 is assembled with both the electric valve 52 and the valve casing 56, a cavity 268 for shaping the first connection member 124 is formed therein. The lower mold 266 has an injection port 270 extending to the cavity 268.

A secondary molding process of the first connection member 124 will be described. First, the valve casing 56 is set on the fixing mold. The first valve unit 210 is inserted into the first cylindrical compartment 60 of the valve casing 56. The stator 212 of the first valve unit 210 is covered with the motor cover 215. In this state, the support part 228a of the bobbin 220 abuts the stepped part 60a of the first cylindrical compartment 60. The rear end of the cylindrical wall part 215c of the motor cover 215 is inserted into the first cylindrical compartment 60. The support part 228a of the bobbin 220 is held between the stepped part 60a of the first cylindrical compartment 60 and the rear end of the cylindrical wall part 215c of the motor cover 215. This assembling is carried out with the rear direction in FIG. 6 oriented downward.

Next, as shown in FIG. 8, the front mold 262, the upper mold 264 and the lower mold 266 are fasten firmly together. The annular rear end surface of the front mold 262 abuts the stepped surface 256 of the cylindrical wall part 215c of the motor cover 215 in a surface contact manner. Thus, when the front mold 262 is placed at a predetermined position for molding, the front mold 262 presses the motor cover 215 toward the stepped part 60a of the first cylindrical compartment 60 such that the support part 228a of the bobbin 220 is firmly held between the motor cover 215 and the stepped part 60a of the first cylindrical compartment 60.

The upper mold 264 is placed to fit an upper half of an outer circumferential surface of the front mold 262. The lower mold 266 is placed to fit a lower half of the outer circumference of the front mold 262. A rear end portion of the upper mold 264 has an inner circumferential surface 264a that does not fit with the outer circumference of the front mold 262 when the upper mold 264 is placed to fit the front mold 262. Similarly, a rear end portion of the lower mold 266 has an inner circumferential surface 266a that does not fit with the outer circumference of the front mold 262 when the lower mold 266 is placed to fit the front mold 262. Thus, there are predetermined gaps between the outer circumferential surface 60b of the first cylindrical compartment 60 and each of the inner circumferential surface 264a and the inner circumferential surface 266a. The radial dimension of each gap is set at a predetermined value, e.g., less than 50 μm.

When the upper mold 264 and the lower mold 266 are fastened together, the whole periphery of the fine projection 254 of the first cylindrical compartment 60 comes into contact with the inner circumferential surface 264a of the upper mold 264 or the inner circumferential surface 266a of the lower mold 266. At this time, the whole periphery of the fine projection 254 is pressed and plastically deformed depending on the degree of contact between the fine projection 254 and each of the inner circumferential surfaces 264a, 266a. Thus, the gaps between the outer circumferential surface 60b of the first cylindrical compartment 60 and each of the inner circumferential surfaces 264a, 266a of the molds 264, 266 can be minimized or eliminated. Due to plastic deformation of the fine projection 254, a breakage of the first cylindrical compartment 60 can be prevented, and dimensional errors between the fine projection 254 and each of the molds 264, 266 can be compensated for.

In this state, a molten resin from an injector (not shown) is injected into the cavity 268 through the injection port 270. Thus, the first connection member 124 is formed so as to fix the cylindrical wall part 215c of the motor cover 215 to the first cylindrical compartment 60 of the valve casing 56. During formation of the first connection member 124, the molten resin presses the retained surface 257 rearward due to injection pressure thereof, so the cylindrical wall part 215c of the motor cover 215 presses the support part 228a of the bobbin 220 on the stepped part 60a of the first cylindrical compartment 60. The injection pressure is, e.g., higher than 10 MPa.

During the injection process, the temperature of the molten resin is higher than the melting point of the resin material used for both the valve casing 56 and the motor cover 215. Thus, contact surfaces of the first cylindrical compartment 60 and the cylindrical wall part 215c in contact with the first connection member 124 melt due to heat of the molten resin. As a result, both the first cylindrical compartment 60 and the cylindrical wall part 215c are integrally coupled with the first connection member 124.

After cooling the resin, the front mold, 262, the upper mold 264 and the lower mold 266 are removed, and then the electric valve 52 coupled with the valve casing 56 is taken out. When the first connection member 124 is cured, the support part 228a of the bobbin 220 is held between the first cylindrical compartment 60 and the cylindrical wall part 215c with a predetermined pressing force.

According to the electric valve 52, the resin-molded first connection member 124 surrounds and encapsulates both the retaining surface 253 and the retained surface 257 therein so as to securely and undetachably couple the first cylindrical compartment 60 of the valve casing 56 with the cylindrical wall part 215c of the motor cover 215. Thus, the first cylindrical compartment 60 of the valve casing 56 can be connected with the cylindrical wall part 215c of the motor cover 215 without any screw, so that increases in the weight and/or the size of the electric valve 52 can be suppressed. As a result, mountability of the closing valve 38 on the vehicle or the like can be improved.

The first cylindrical compartment 60 has the fine projection 254 extending along the rear edge of the first connection member 124. During formation of the first connection member 124, the whole periphery of the fine projection 254 abuts either the upper mold 264 or the lower mold 266, so the radial distance between the fine projection 254 and each of the upper mold 264 and the lower mold 266 can be minimized, thereby reducing the potential for the molten resin to leak from the cavity 268 and form resin burrs.

The first connection member 124 is integrally joined with both the first cylindrical compartment 60 and the cylindrical wall part 215c due to partial melting of both the first cylindrical compartment 60 and the cylindrical wall part 215c during formation of the first connection member 124. Thus, it is able to improve sealing performance between the first connection member 124 and each of the first cylindrical compartment 60 and the cylindrical wall part 215c.

The support part 228a is held between the first cylindrical compartment 60 and the cylindrical wall part 215c. Thus, the support part 228a can be disposed in the first valve housing 250 without any additional member for fixing the support part 228a. As a result, increases in the weight, the cost and/or the size can be prevented.

Figure 11:
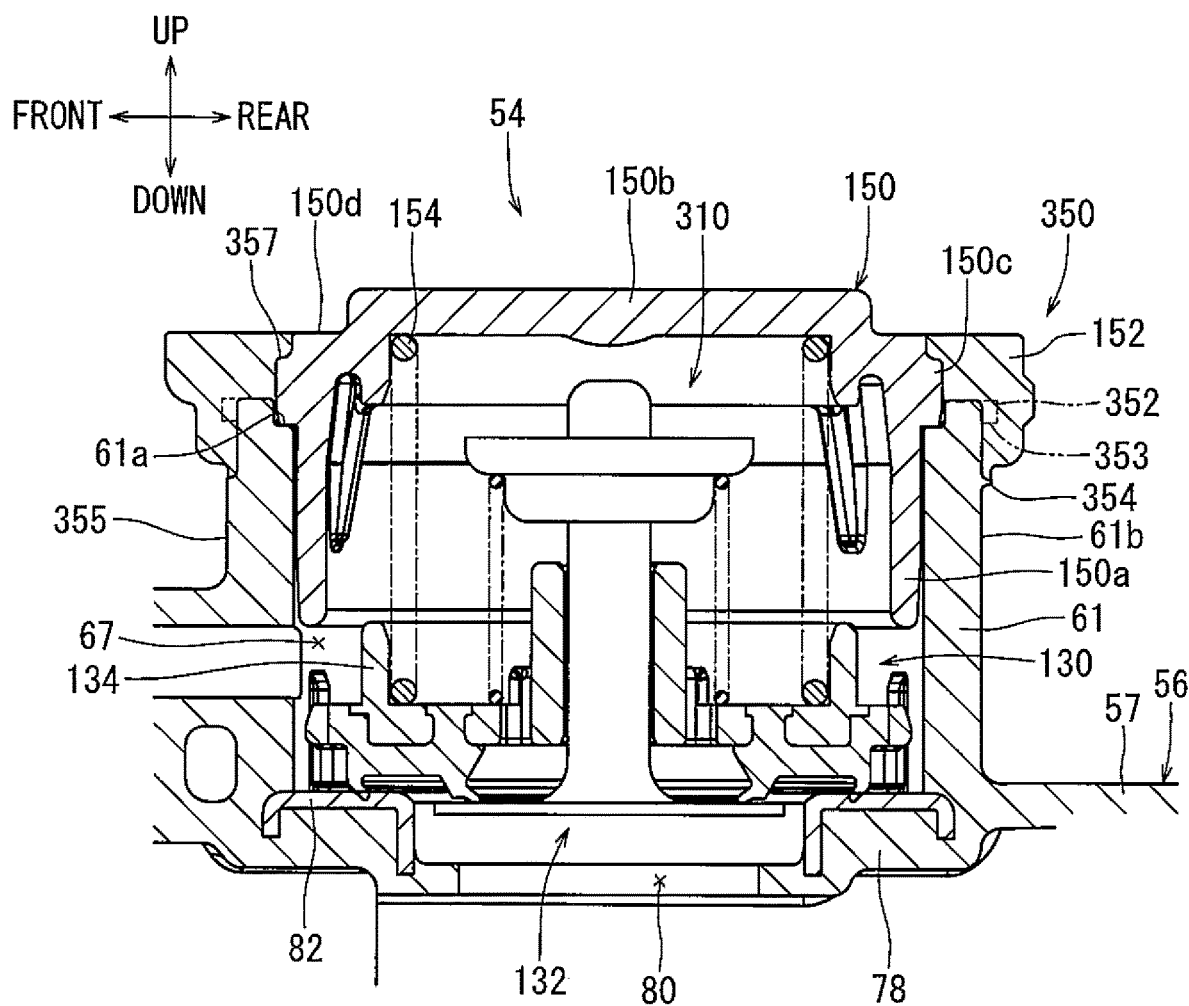
FIG. 11 is a cross-sectional view of a connection structure between the valve casing and a cap of the relief valve of FIG. 9.

A connection structure between the valve casing 56 and the cap 150 is shown in FIG. 11. As shown in FIG. 11, the second cylindrical compartment 61 of the valve casing 56 and the cap 150 form a second valve housing 350. In this disclosure, the second cylindrical compartment 61 of the valve casing 56 corresponds to "first connection pipe part". The cylindrical part 150a of the cap 150 corresponds to "second connection pipe part".

As shown in FIG. 11, the second cylindrical compartment 61 of the valve casing 56 has a ring-shaped stepped surface 61a at an inner circumferential portion thereof for supporting the flange part 150c of the cap 150. The stepped surface 61a extends radially to face upward. The cylindrical part 150a of the cap 150 is fitted into the second cylindrical compartment 61 such that the flange part 150c of the cap 150 abuts the stepped surface 61a.

Figure 12:
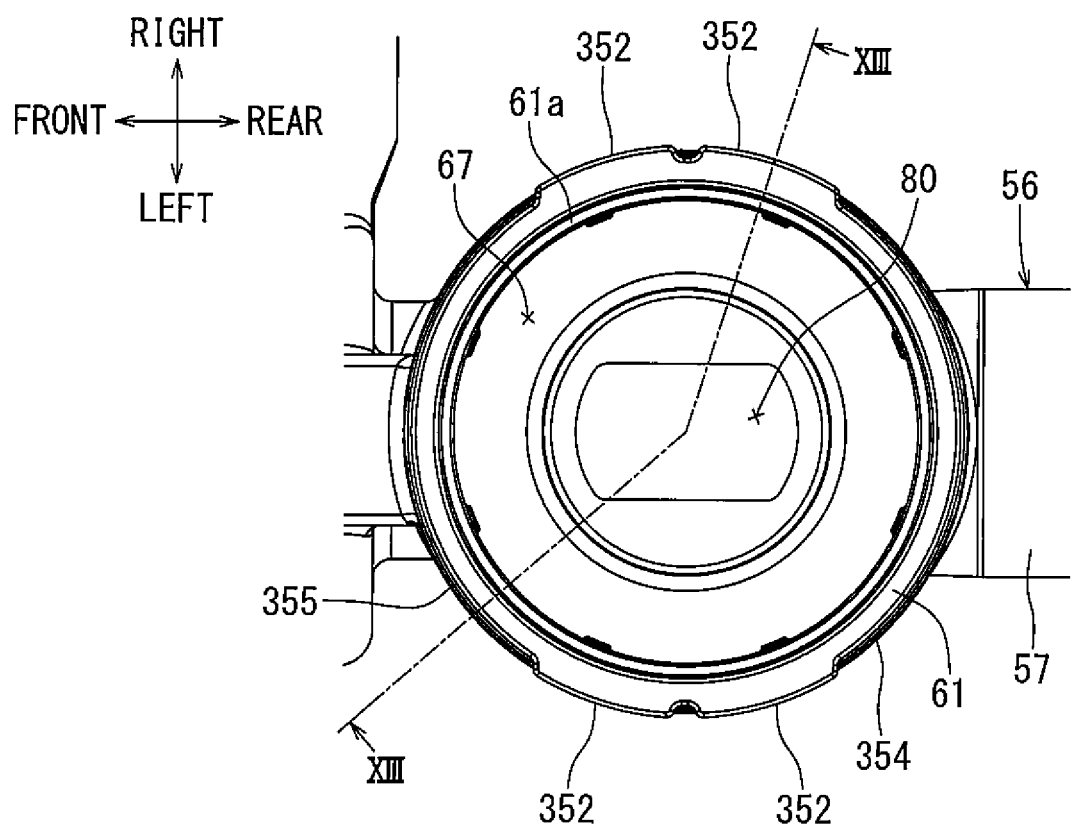
FIG. 12 is a plan view of a second cylindrical compartment of the valve casing of the relief valve of FIG. 9.
Figure 13:
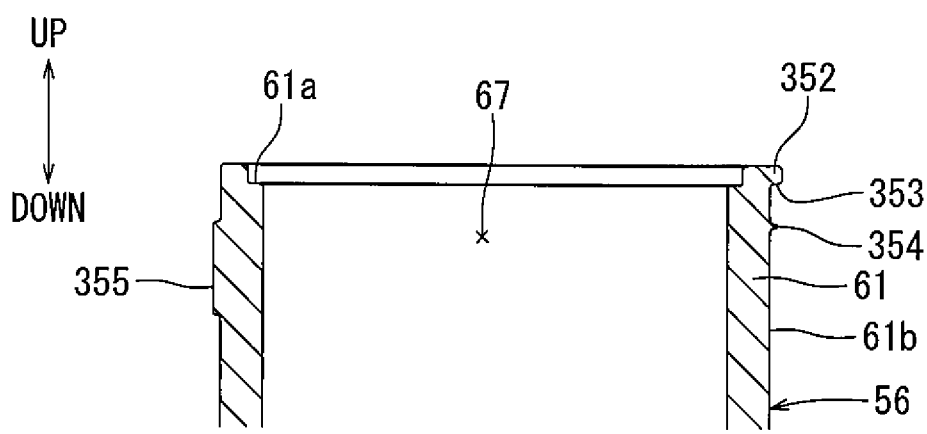
FIG. 13 is a cross-sectional view of the second cylindrical compartment of FIG. 12 taken in section XIII-XIII of FIG. 12.

As shown in FIG. 12, the second cylindrical compartment 61 includes four engagement parts 352. As shown in FIG. 11, each of the engagement parts 352 has a flange shape extending radially outward from an upper end of the second cylindrical compartment 61. As shown in FIG. 12, the engagement parts 352 are intermittently aligned in the circumferential direction. The engagement parts 352 are symmetrically arranged at both right and left side portions of the second cylindrical compartment 61 in the right-left direction. As shown in FIG. 13, each of the engagement parts 352 has a square cross-sectional shape along the axis of the second cylindrical compartment 61. A lower surface of each engagement part 352 is a retaining surface 353. In this disclosure, the retaining surface 353 corresponds to "first engagement part".

As shown in FIG. 11, an outer circumferential surface 61b of the second cylindrical compartment 61 has a fine projection 354 and a projecting surface 355. Specifically, as shown in FIG. 10, the projecting surface 355 has a thin plate shape extending in the right-left direction along a front surface of the second cylindrical compartment 61. The fine projection 354 extends circumferentially along an outer circumferential surface of the second cylindrical compartment 61 except at its front surface. An upper edge of the fine projection 354 is continuous with an upper edge of the projecting surface 355 in the circumferential direction.

As shown in FIG. 11, the fine projection 354 and the projecting surface 355 are positioned below the engagement parts 352 at a predetermined interval. The fine projection 354 and the projecting surface 355 extend circumferentially along a lower edge of the second connection member 152. The fine projection 354 has a triangle shaped cross-section that tapers radially outward along the axis of the second cylindrical compartment 61. The fine projection 354 is plastically deformable in a radially inward direction. The projecting surface 355 has a curved plate shape at the outer circumferential surface 61b of the second cylindrical compartment 61. The projecting distance of the projecting surface 355 is equal to that of the fine projection 354. In this disclosure, each of the fine projection 354 and the projecting surface 355 corresponds to "projection".

An upper surface of the flange part 150c of the cap 150 is a retained surface 357. The retained surface 357 has a ring shape and extends radially inward from an upper end of an outer circumferential surface of the flange part 150c. The retained surface 357 is positioned below an upper end surface 150d of the cylindrical part 150a at a predetermined interval. In this disclosure, the retained surface 357 corresponds to "second engagement part".

The second connection member 152 is secondarily molded by molding a resin material around the whole circumferences of the second cylindrical compartment 61 and the cylindrical part 150a. The second connection member 152 is formed to encapsulate therein, i.e., cover both the retained surface 357 and the engagement parts 352 each containing the retaining surface 353. The second connection member 152 prevents the cap 150 from being detached from the second cylindrical compartment 61. A lower end of the second connection member 152 extends to each of the fine projection 354 and the projecting surface 355. In this disclosure, the second connection member 152 corresponds to "secondary molded member". Each of the valve casing 56 and the cap 150 corresponds to "primary molded member".

Figure 14:
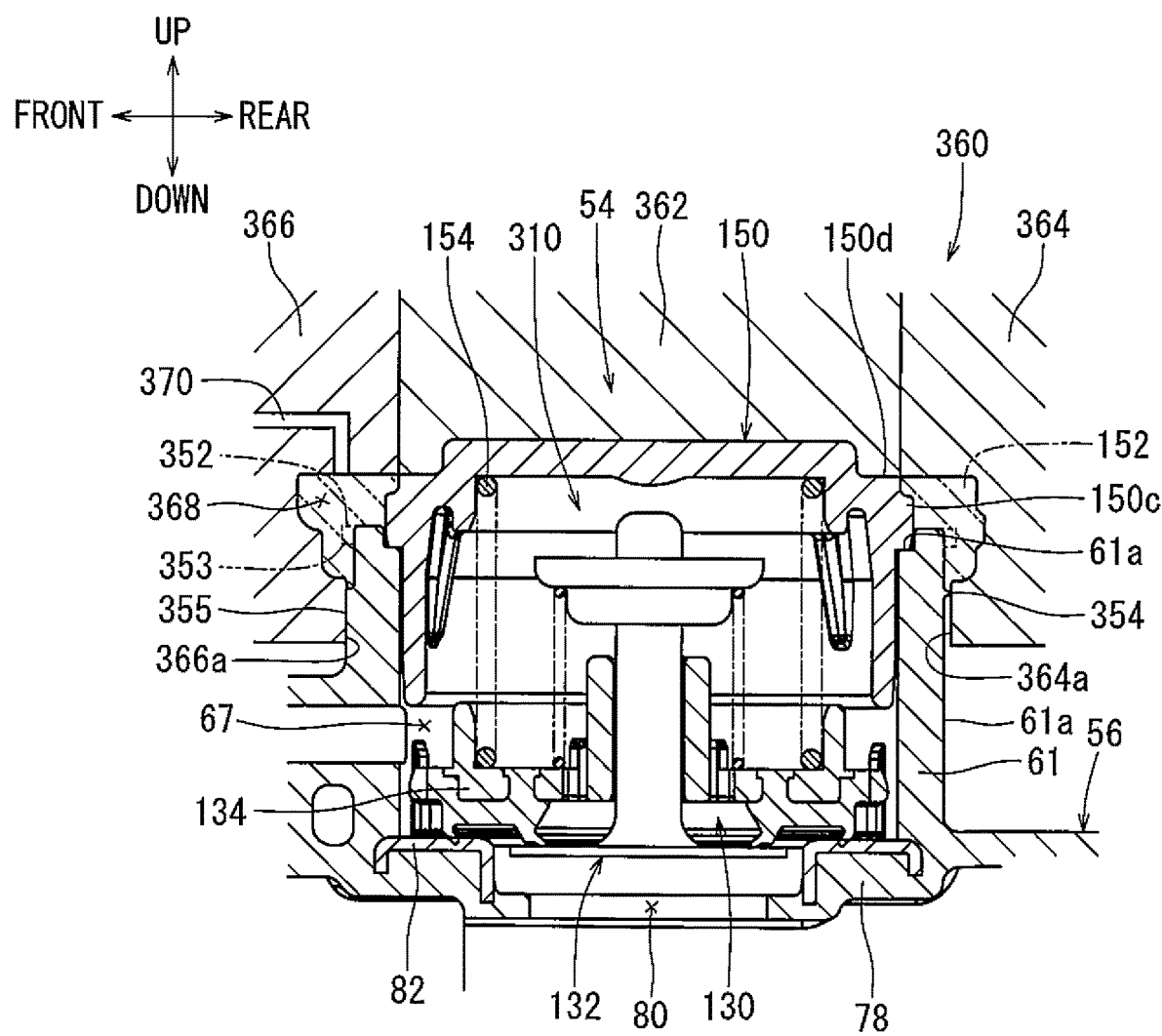
FIG. 14 is a cross-sectional view illustrating molds for a second connection member of the relief valve of the closing valve of FIG. 2.

FIG. 14 shows a cross-section of a second mold set 360 used for molding the second connection member 152. Directions shown in FIG. 14 are based on the directions of the closing valve 38, but do not limit arrangement orientation of the second mold set 360.

As shown in FIG. 14, the second mold set 360 includes an upper mold 362, a rear mold 364, and a front mold 366. The upper mold 362 moves in the vertical direction. The rear mold 364 and the front mold 366 move in the front-rear direction.

The second mold set 360 has a fixing mold (not shown) for holding the valve casing 56. When the second mold set 360 is assembled, a cavity 368 for molding the second connection member 152 is formed therein. The front mold 366 has an injection port 370 that extends to the cavity 368.

A secondary molding process of the second connection member 152 will be described. First, the valve casing 56 is set at the fixing mold of the second mold set 360. The second valve unit 310 is disposed in the second cylindrical compartment 61 of the valve casing 56. The cylindrical part 150a of the cap 150 is fitted into the second cylindrical compartment 61 such that the flange part 150c of the cap 150 abuts the stepped surface 61a of the second cylindrical compartment 61. This assembling is carried out in the downward direction shown in FIG. 10.

Next, as shown in FIG. 14, the upper mold 362, the rear mold 364, and the front mold 366 are firmly fastened together. A ring-shaped lower end surface of an outer circumferential part of the upper mold 362 abuts the upper end surface 150d of the cap 150 in a surface contact manner. When the upper mold 362 is located at a predetermined position for molding, the cap 150 is pressed on the stepped surface 61a of the second cylindrical compartment 61.

The front mold 366 is located to fit a front half of the outer circumferential surface of the upper mold 362. The rear mold 364 is located to fit a rear half of the outer circumferential surface of the upper mold 362. The front mold 366 has an inner circumferential surface 366a at a lower end portion thereof. When the front mold 366 is located at the predetermined position for molding, the inner circumferential surface 366a fits the projecting surface 355 and does not fit with the outer circumferential surface 61a of the second cylindrical compartment 61. Similarly, a lower end portion of the rear mold 364 has an inner circumferential surface 364a that does not fit with the outer circumferential surface 61a of the second cylindrical compartment 61 when the rear mold 364 is located at the predetermined position. Thus, there is a predetermined gap between the outer circumferential surface 61b of the second cylindrical compartment 61 and each of the inner circumferential surfaces 364a, 366a. The radial dimension of the gap is set at a predetermined value, e.g., less than 50 μm.

The whole periphery composed of the fine projection 354 and the projecting surface 355 of the second cylindrical compartment 61 of the valve casing 56 abuts the inner circumferential surfaces 364a, 366a of the molds 364, 366. In this state, the projecting surface 355 abuts on the inner circumferential surface 366a of the lower end portion of the front mold 366 in a surface contact manner.

When the rear mold 364 and the front mold 366 are fastened together, the outer periphery of the fine projection 354 comes into contact with each of the inner circumferential surface 364a of the rear mold 364 and the inner circumferential surface 366a of the front mold 366. At this time, the fine projection 354 is pressed and plastically deformed depending on the degree of contact between the fine projection 354 and each of the inner circumferential surfaces 364a, 366a. Thus, the gaps between the outer circumferential surface 61b of the second cylindrical compartment 61 and each of the inner circumferential surfaces 364a, 366a of the molds 364, 366 can be minimized or eliminated. Due to plastic deformation of the fine projection 354, a breakage of the second cylindrical compartment 61 can be prevented, and dimensional errors between the fine projection 354 and each of the molds 364, 366 can be accommodated for.

In this state, a molten resin from an injector (not shown) is injected into the cavity 368 through the injection port 370. Thus, the second connection member 152 is formed so as to fix the cap 150 to the second cylindrical compartment 61 of the valve casing 56.

During the molding process, the temperature of the molten resin is higher than the melting point of the resin material used for both the valve casing 56 and the cap 150. Thus, contact surfaces of the second cylindrical compartment 61 and the cap 150 in contact with the second connection member 152 melt due to heat of the molten resin. As a result, both the second cylindrical compartment 61 and the cap 150 are integrally joined with the second connection member 152.

After cooling the resin, the upper mold 362, the rear mold 364 and the front mold 366 are removed, and then the relief valve 54 combined with the valve casing 56 is taken out.

With respect to the relief valve 54, the resin-molded second connection member 152 surrounds and encapsulates both the retaining surface 353 and the retained surface 357 therein so as to securely and undetachably couple the second cylindrical compartment 61 of the valve casing 56 with the cylindrical part 150a of the cap 150. Thus, the second cylindrical compartment 61 of the valve casing 56 can be connected with the cylindrical part 150a of the cap 150 without any screw, so that increases in the weight and/or the size of the relief valve 54 can be suppressed. As a result, mountability of the closing valve 38 on the vehicle or the like can be improved.

The second cylindrical compartment 61 has the fine projection 354 and the projecting surface 355 each of which extends along the circumferential edge of the second connection member 152. During formation of the second connection member 152, the fine projection 354 is plastically deformed due to contact between the fine projection 354 and each of the rear mold 364 and the front mold 366, so the radial distances between the fine projection 354 and the rear mold 364 and between the projecting surface 355 and the front mold 366 can be minimized, thereby reducing the potential for the molten resin to leak from the cavity 368 and form resin burrs.

The second connection member 152 is integrally coupled with both the second cylindrical compartment 61 and the cylindrical part 150a due to partial melting of the second cylindrical compartment 61 and the cylindrical part 150a during formation of the second connection member 152. Thus, sealing performance between the second connection member 152 and each of the second cylindrical compartment 61 and the cylindrical part 150a is enhanced.

A second embodiment will be described. The second embodiment is substantially the same as the first embodiment with some changes. Thus, while the changes will be described, same configurations will not be described in the interest of conciseness. The changes relate to an installation structure of the O-ring 244 on the electric valve 52.

Figure 15:
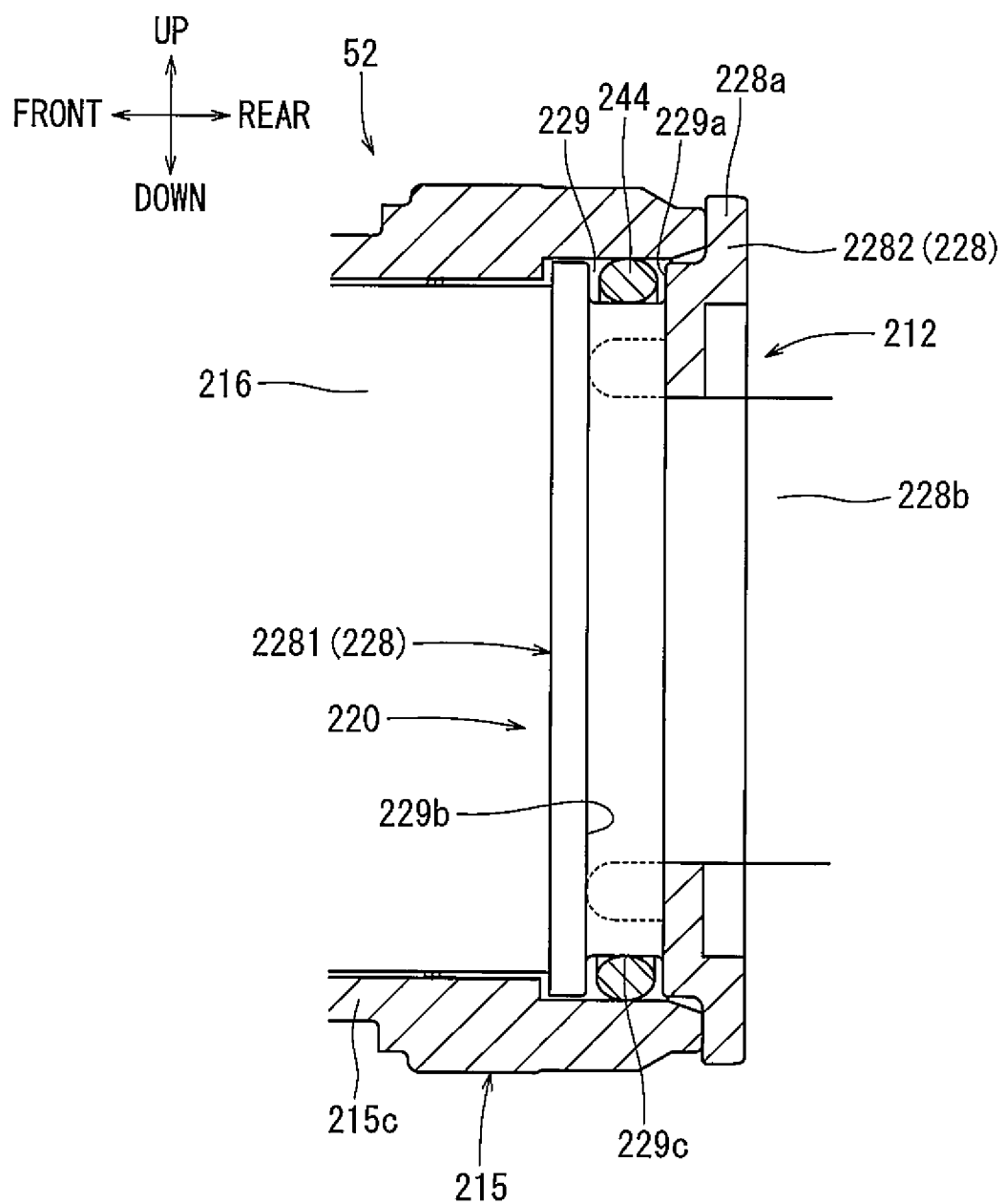
FIG. 15 is a cross-sectional view of a part of the electric valve according to a second embodiment.

As shown in FIG. 15, the bobbin 220 has a ring groove 229 for holding the O-ring 244 therein. The ring groove 229 extends along the circumferential surface of the bobbin 220 and has a rear wall surface 229a, a front wall surface 229b, and a bottom wall surface 229c. In this embodiment, the fitting cylinder part 228 of the bobbin 220 includes a body part 2281 and a retaining member 2282. The retaining member 2282 has an annular shape including the support part 228a and is mounted around the sleeve part 228b of the fitting cylinder part 228. The retaining member 2282 is made from a resin material and is configured to be fitted with the body part 2281 from the rear. The rear wall surface 229a of the ring groove 229 is formed at the retaining member 2282. The front wall surface 229b and the bottom wall surface 229c are formed at the body part 2281. Thus, the ring groove 229 is formed by combining the retaining member 2282 with the body part 2281. In addition, the bottom wall surface 229c is formed such that the O-ring 244 can be fitted with the bottom wall surface 229c from the rear when the retaining member 2282 is not fitted with the body part 2281.

An attachment of the O-ring 244 to the bobbin 220 will be described. First, the O-ring 244 is fitted with the bottom wall surface 229c of the body part 2281 of the fitting cylinder part 228 from the rear. Then, the retaining member 2282 is fitted with the sleeve part 228b of the fitting cylinder part 228 so as to retain the O-ring 244. Although not shown in FIG. 15, when the electric valve 52 is combined with the valve casing 56 by the first connection member 124, the support part 228a of the retaining member 2282 is held between the stepped part 60a of the first cylindrical compartment 60 of the valve casing 56 and the cylindrical wall part 215c of the motor cover 215 similar to the first embodiment.

In accordance with the second embodiment, the O-ring 244 can be easily fitted with the bottom wall surface 229c formed at the body part 2281 of the fitting cylinder part 228 of the motor body 211, thereby improving the mountability of the O-ring 244 on the fitting cylinder part 228 of the motor body 211. In addition, the retaining member 2282 can prevent the O-ring 244 from being detached from bottom wall surface 229c of the ring groove 229.

A third embodiment will be described. The third embodiment is substantially the same as the second embodiment with some changes. Thus, while the changes will be described, same configurations will not be described in the interest of conciseness. The changes relate to a sealing structure of the first valve housing 250 of the electric valve 52.

Figure 16:
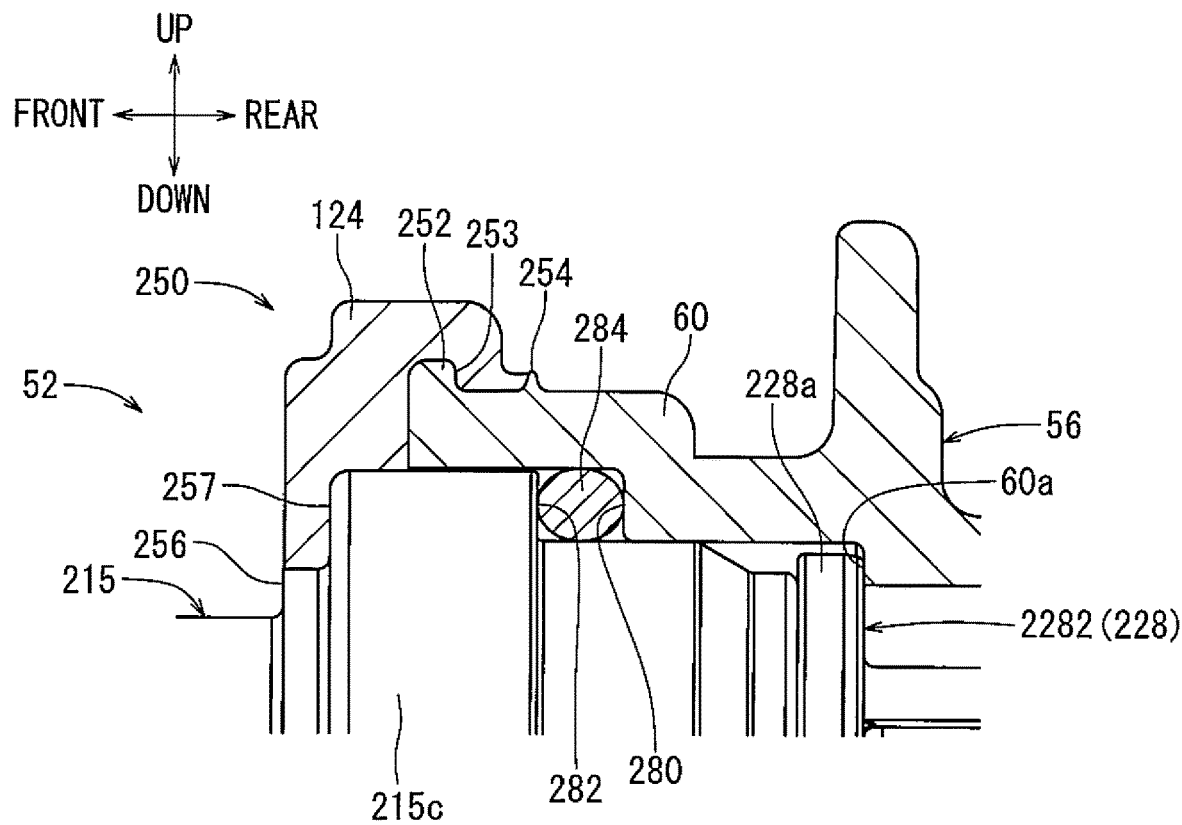
FIG. 16 is a cross-sectional view of a part of the electric valve according to a third embodiment.

As shown in FIG. 16, at an inner circumferential surface of the first cylindrical compartment 60 of the valve casing 56, a first stepped groove part 280 extends radially and increases the inner diameter of the first cylindrical compartment 60 in the forward direction. Similarly, at an outer circumferential surface of the cylindrical wall part 215c of the motor cover 215, a second stepped groove part 282 extends radially and decreases the outer diameter of cylindrical wall part 215c in the rearward direction. The stepped groove parts 280, 282 define an annular space extending along the outer circumferential surface of the cylindrical wall part 215c. An O-ring 284 is disposed in the annular space between the first stepped groove part 280 of the first cylindrical compartment 60 and the second stepped groove part 282 of the cylindrical wall part 215c for elastically sealing between the first cylindrical compartment 60 and the cylindrical wall part 215c. The O-ring 284 is made from a rubber-like elastic material. In this disclosure, the O-ring 284 corresponds to "sealing member".

In accordance with the third embodiment, the O-ring 284 is disposed between the first cylindrical compartment 60 of the first valve housing 250 and the cylindrical wall part 215c for sealing therebetween. Thus, sealing performance between the first cylindrical compartment 60 and the cylindrical wall part 215c can be improved. It should be appreciated that this sealing structure of the present embodiment can be applied to the electric valve 52 of the first embodiment.

A fourth embodiment will be described. The fourth embodiment is substantially the same as the first embodiment with some changes. Thus, while the changes will be described, same configurations will not be described in the interest of conciseness. The changes relates to sealing structure of the second valve housing 350 of the relief valve 54.

Figure 17:
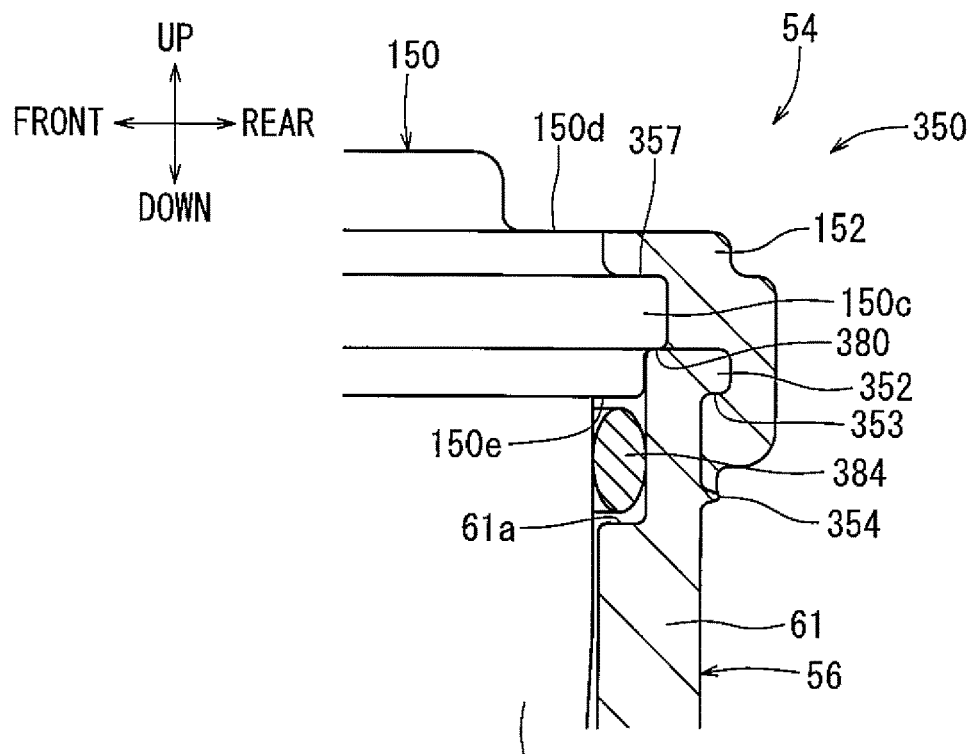
FIG. 17 is a cross-sectional view of a part of the relief valve according to a fourth embodiment.

As shown in FIG. 17, an annular space is formed between the stepped surface 61a of the second cylindrical compartment 61 of the valve casing 56 and a lower surface 150e of the flange part 150c of the cap 150. An O-ring 384 is disposed in the annular space for elastically sealing between the second cylindrical compartment 61 and the cylindrical part 150a. The O-ring 384 is made from a rubber-like elastic material. In this disclosure, the O-ring 384 corresponds to "sealing member".

The flange part 150c of the cap 150 has a stepped surface 380. The stepped surface 380 has a ring shape and extends radially inward from an outer circumferential surface of the flange part 150c to face downward. The stepped surface 380 is above the lower surface 150e at a predetermined interval. The stepped surface 380 has the larger diameter than the lower surface 150e. The stepped surface 380 abuts an inner circumferential portion of the upper end surface of the second cylindrical compartment 61.

In accordance with the fourth embodiment, the O-ring 384 is disposed between the second cylindrical compartment 61 and the cylindrical part 150a for sealing therebetween, thereby improving the sealing performance between the second cylindrical compartment 61 and the cylindrical part 150a.

The present teaching is not limited to the above-described embodiments and can be modified variously. For example, the present teaching may be applied to various fluid control valves other than the electric valve 52 and the relief valve 54 of the closing valve 38.

The first engagement part may be formed at a part of the whole circumference of the first connection pipe part or may be intermittently in the whole circumference. The first engagement part may be formed in any shape capable of preventing detachment between the first and second connection pipe parts, such as a flat shape perpendicular to or inclined with respect to the axis of the first connection pipe part, a curved shape or a stepped shape.

The second engagement part may be formed at a part of the whole circumference of the second connection pipe part or may be intermittently in the whole circumference. The second engagement part may be formed in any shape capable of preventing detachment between the first and second connection pipe parts, such as a flat shape perpendicular to or inclined with respect to the axis of the second connection pipe part, a curved shape or a stepped shape.

The projection may be formed at the second connection pipe part instead of or in addition to the first connection pipe part.

The temperature of the molten resin for the secondary molding may be set to be less than the molting point of at least one of the first and second connection pipe parts.

The electric motor 92 of the electric valve 52 may be composed of a DC motor capable of controlling rotation direction, rotation speed, and rotation amount thereof. In such case, it is preferred to initialize the start point of the DC sensor by utilizing a stroke sensor detecting a position of the valve guide 94.

The electric motor 92 of the electric valve 52 may have the output shaft 93 incorporating a screw feeder therein for moving in the axial direction. In such case, the output shaft 93 may be integrated with the valve guide 94 or the valve member 96.

The output shaft 93 of the electric motor 92 may be coupled with the valve member 96 instead of the valve guide 94.

The electric valve 52 may be composed of a solenoid valve having an electromagnetic solenoid and configured to be closed while power is not supplied and to be open while power is supplied.

What is claimed is:
1. A fluid control valve, comprising:
   a valve unit;
   a valve casing housing the valve unit therein, wherein the valve casing includes a first connection pipe part and a second connection pipe part, wherein the first connection pipe part has a hollow pipe shape with a first engagement part extending in a direction perpendicular to or inclined with respect to an axis of the first connection pipe part, wherein the second connection pipe part has a hollow pipe shape with a second engagement part, wherein the first connection pipe part is connected to the second connection pipe part; and a secondary molded member made of a resin material and covering the first engagement part and the second engagement part to prevent the first connection pipe part from being detached from the second connection pipe part, wherein the first connection pipe part has a projection spaced apart from the first engagement part by a predetermined distance;

wherein the secondary molded member comprises a terminal end extending radially outwards to an outer cylindrical surface of the secondary molded member, and wherein the projection extends along the terminal end of the secondary molded member so as to be exposed outside of the secondary molded member; and wherein the projection extends in a radial direction of the valve casing up to the outer surface of the cylindrical surface of the terminal end of the secondary molded member.

2. The fluid control valve according to claim 1, wherein the first connection pipe part and the second connection pipe part are made of a resin material having a melting point lower than the secondary molded member; and wherein the secondary molded member is integrally joined with both the first connection pipe part and the second connection pipe part.

3. The fluid control valve according to claim 1, wherein the first connection pipe part and the second connection pipe part hold a separate member therebetween.

4. The fluid control valve according to claim 1, further comprising:

a sealing member disposed between the first connection pipe part and the second connection pipe part for sealing therebetween.

5. The fluid control valve according to claim 1, wherein the first engagement part extends in the circumferential direction of the first connection pipe part.

6. The fluid control valve according to claim 5, wherein the first engagement part extends continuously along the whole circumference of the first connection pipe part.

7. The fluid control valve according to claim 1, wherein the second engagement part extends in the circumferential direction of the second connection pipe part.

8. The fluid control valve according to claim 7, wherein the second engagement part extends continuously along the whole circumference of the second connection pipe part.

9. The fluid control valve according to claim 1, wherein the secondary molded member has a ring shape and is mounted around the first connection pipe part.

10. The fluid control valve according to claim 1, wherein the first connection pipe part comprises a threadless groove extending cylindrically between the first engagement part and the projection by the predetermined distance.

* * * * *